(12) United States Patent  (10) Patent No.: US 12,073,126 B2
Okuno  (45) Date of Patent: Aug. 27, 2024

(54) PRINTING DEVICE AND PRINT AMOUNT MANAGEMENT SYSTEM

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/396,889

(22) Filed: Dec. 27, 2023

(65) Prior Publication Data

US 2024/0220170 A1    Jul. 4, 2024

(30) Foreign Application Priority Data

Dec. 28, 2022 (JP) ................................. 2022-211900

(51) Int. Cl.
*G06F 3/12* (2006.01)
*G06Q 20/42* (2012.01)
*H04N 1/34* (2006.01)

(52) U.S. Cl.
CPC ............ *G06F 3/1204* (2013.01); *G06F 3/122* (2013.01); *G06F 3/1236* (2013.01); *G06F 3/1239* (2013.01); *G06F 3/1254* (2013.01); *G06Q 20/42* (2013.01); *H04N 1/346* (2013.01); *G06F 3/12* (2013.01)

(58) Field of Classification Search
None
See application file for complete search history.

(56) References Cited

U.S. PATENT DOCUMENTS

2016/0012465 A1* 1/2016 Sharp .................. G06Q 20/321
                                                                          705/14.17
2020/0349536 A1* 11/2020 Hertel ................. G06Q 20/384
2022/0137891 A1   5/2022 Kawaguchi et al.

FOREIGN PATENT DOCUMENTS

JP      2021068372 A    4/2021
JP      2021018621 A    9/2023

* cited by examiner

*Primary Examiner* — Darryl V Dottin
(74) *Attorney, Agent, or Firm* — Merchant & Gould P.C.

(57) ABSTRACT

A printing device is configured to perform printing with an allowed print amount. The printing device includes a controller to obtain addition type information representing a first guaranteed print amount or a second guaranteed print amount. The first guaranteed print amount corresponds to a first printing privilege to be purchased manually by a user, and the second guaranteed print amount corresponds to a second printing privilege to be automatically purchased. The controller switches, based on the addition type information, a control mode between a first mode in which the first guaranteed print amount is added to the allowed print amount and a second mode in which the second guaranteed print amount is added to the allowed print amount.

14 Claims, 17 Drawing Sheets

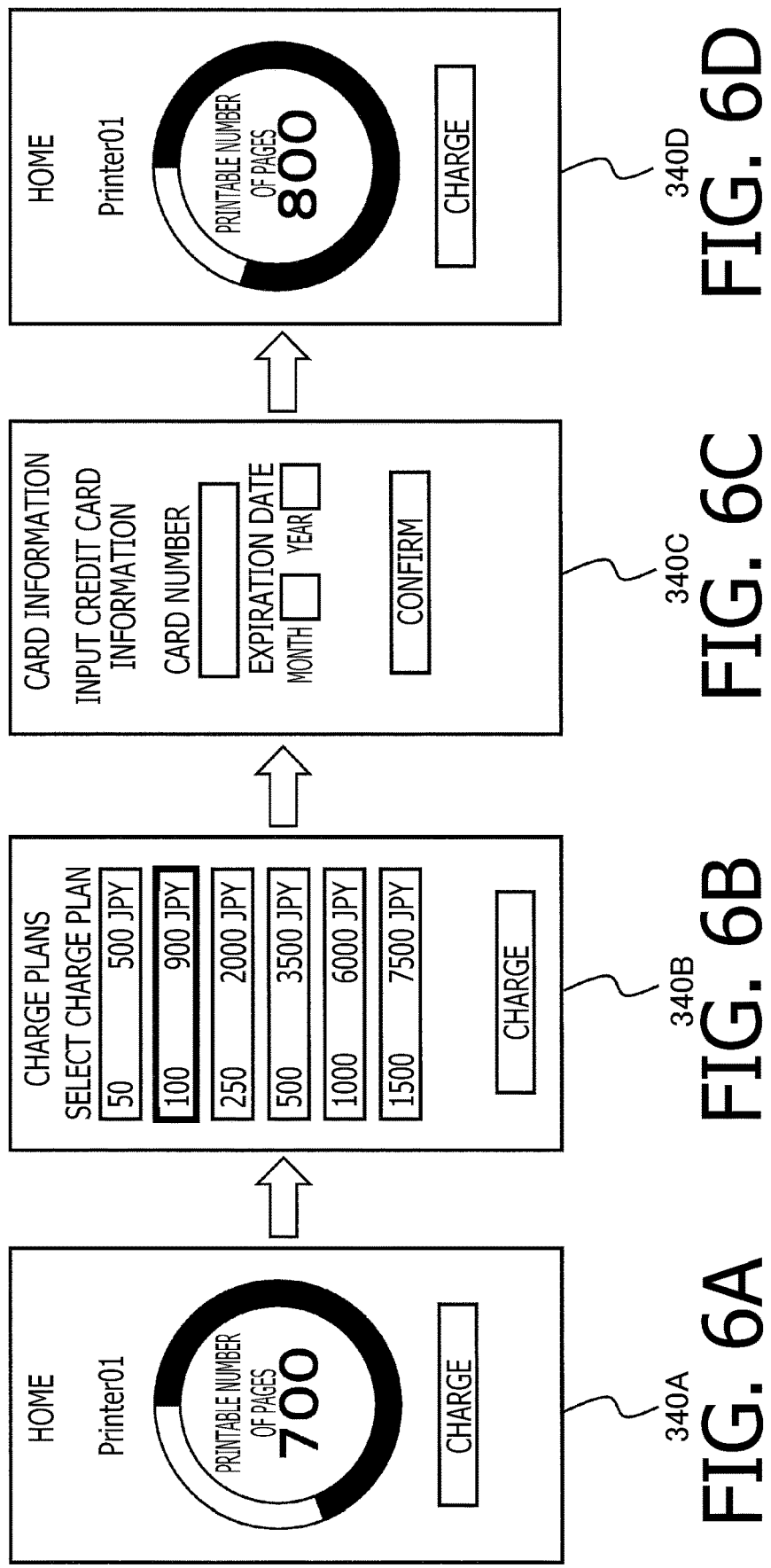

PRINTING DEVICE AND PRINT AMOUNT MANAGEMENT SYSTEM

REFERENCE TO RELATED APPLICATIONS

This application claims priority from Japanese Patent Application No. 2022-211900 filed on Dec. 28, 2022. The entire content of the priority application is incorporated herein by reference.

BACKGROUND ART

The present disclosure relates to a printing device and a print amount management system.

There is known a service in which users of printing devices pay service providers a fee in accordance with a print amount (e.g., the number of printed pages). In such a service, a prepaid fee system may be introduced. As an example of the prepaid fee system, there is known technology that allows users to purchase a printing privilege for a certain fee and allows the users to print up to a particular print amount guaranteed by the printing privilege.

SUMMARY

In the conventional technology described above, when an allowed print amount (i.e., a printable amount), which is calculated based on the guaranteed print amount that is guaranteed by the printing privilege and decremented as printing proceeds, reaches a particular value (e.g., zero) during execution of print jobs, the printing is stopped. In such a case (i.e., when the print job has been interrupted as the allowed print amount has reached zero), the user needs to manually operate a terminal device or the like to purchase another printing privilege so that the guaranteed print amount guaranteed by the printing privilege is added to the allowed print amount, thereby the allowed print amount being increased and the printing can be continued.

According to aspects of the present disclosure, there is provided a printing device having a print engine and a controller. The printing device is configured to perform printing with an allowed print amount. The controller is configured to obtain addition type information representing a first guaranteed print amount or a second guaranteed print amount. The first guaranteed print amount corresponds to a first printing privilege to be purchased based on a purchase request due to a manual operation by a user, and the second guaranteed print amount corresponds to a second printing privilege to be purchased based on auto purchasing without the purchase request by the user. The controller is further configured to switch, based on the addition type information as obtained, a control mode between a first mode in which the first guaranteed print amount is added to the allowed print amount and a second mode in which the second guaranteed print amount is added to the allowed print amount.

According to aspects of the present disclosure, there is provided a print amount management system, which is provided with a terminal device, a printing device configured to print an image on a sheet and a management device including a communication interface through which the management device is communicable with the printing device and the terminal device and a controller configured to manage the printing device. The print amount management system may include hardware configured to obtain addition type information representing a first guaranteed print amount or a second guaranteed print amount. The first guaranteed print amount corresponds to a first printing privilege to be purchased based on a purchase request due to a manual operation by a user, and the second guaranteed print amount corresponds to a second printing privilege to be purchased based on an auto purchasing without the purchase request by the user. The controller is further configured to switch, based on the addition type information as obtained, a control mode between a first mode in which the first guaranteed print amount is added to an allowed print amount of the printing device and a second mode in which the second guaranteed print amount is added to the allowed print amount.

BRIEF DESCRIPTION OF DRAWINGS

FIGS. 6A-6D show examples of a screen displayed on a touch panel of the terminal device when switching of the control mode is not performed, and the number of charged pages is added to the printable number of pages by a manual operation by the user when the control mode is the manual charging mode.

DESCRIPTION

Figure 1:
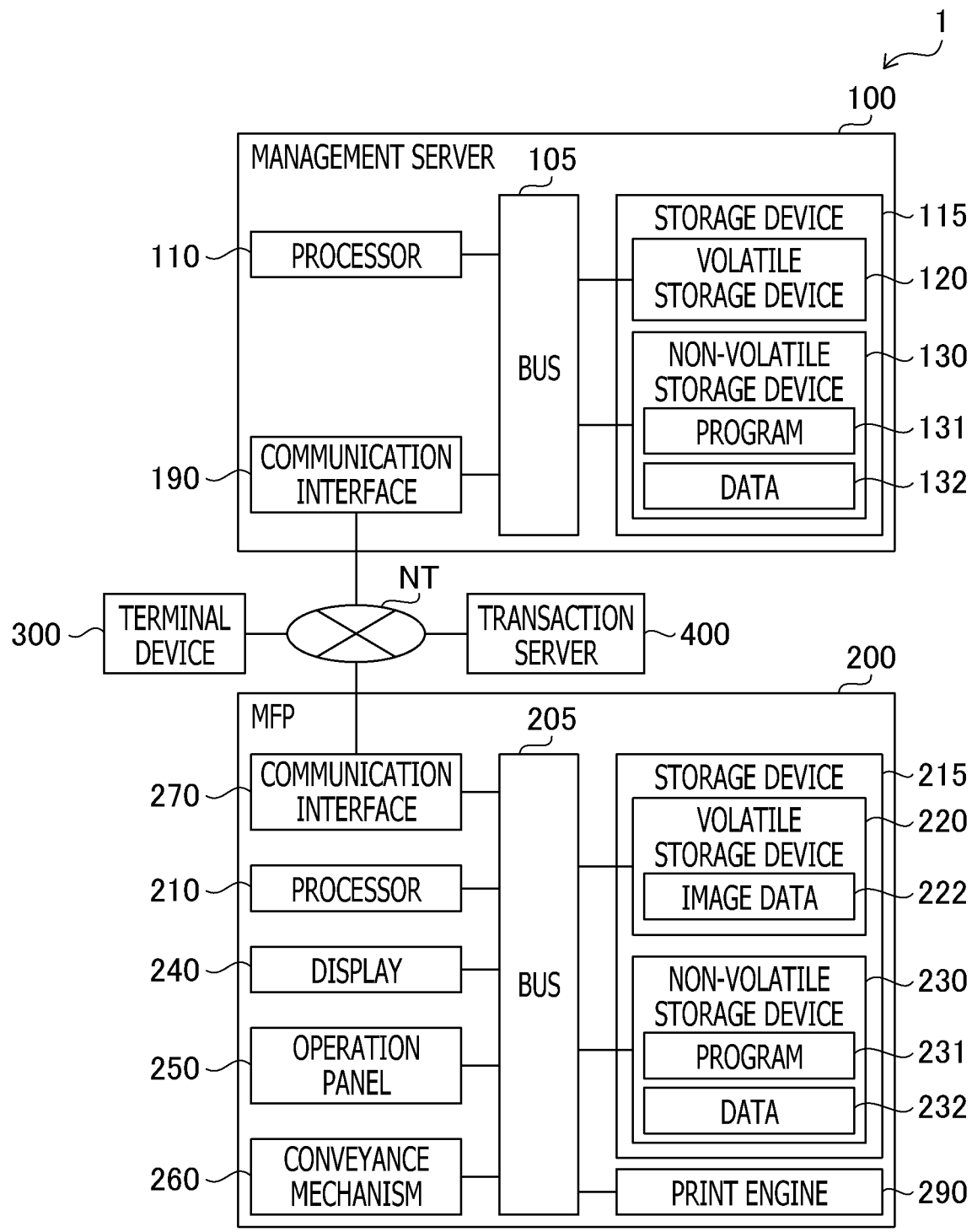
FIG. 1 is a block diagram showing an example of a configuration of a print service providing system.

Hereinafter, referring to the accompanying drawings, embodiments and modifications according to aspects of the present disclosure will be described.
Overview of Print Service Providing System FIG. 1 shows an example of a configuration of a print service providing system 1 according to an embodiment of the present disclosure. The print service providing system 1 is configured to provide a prepaid print service in which each user (i.e., a customer) pays a fee in advance and uses a printing function of an MFP (multi-function peripheral) 200.

As shown in FIG. 1, the print service providing system 1 includes a management server 100, the MFP 200, a terminal device 300 and a transaction server 400, which are connected to a network NT so as to communicate with each other. It is noted that the network NT may include a cellular phone communication line.

It is noted that the print service providing system 1 is an example of a print management system, the management server 100 is an example of an information management device, and the MFP 200 is an example of a printing device according to aspects of the present disclosure.
Management Server The management server 100 is a server that is installed and managed by, for example, a manufacturer of the MFP 200. As shown in FIG. 1, the management server 100 includes a processor 110, a storage device 115, and a communication interface 190, which are mutually connected through a bus 105 so as to transmit/receive data thereamong.

The storage device 115 includes a volatile storage device 120 and a non-volatile storage device 130. The volatile storage device 120 is, for example, a DRAM, which is configured to store various programs and data subjected to be processed. The non-volatile storage device 130 is, for example, a hard disk drive or a solid-state drive, and is provided with a program storage area 131 and a data storage area 132.

In the program storage area 131, various programs are stored. It is noted that the various programs include programs corresponding to processes based on, for example, a sequence chart shown in FIG. 4, which will be described in detail later. In the data storage area 132, various data including, for example, the printable number of pages, the number of charged pages and the like are stored for each MFP 200 subjected to be managed.

The processor 110 is a device (e.g., a CPU) configured to perform data processing, and is configured to execute programs stored in the program storage area 131. The processor 110 is further configured to perform various processes including a data communication with the terminal device 300, the MFP 200, and the transaction server 400, which are connected to the network NT. The processor 110 is further configured to perform purchasing a printing privilege for the print service providing system 1. It is noted that the processor 110 and the programs stored in the program storage area 131 constitute an example of a controller according to aspects of the present disclosure.

The communication interface 190 is, for example, a wired LAN interface or a wireless LAN interface configured to communicate with other devices, and is connected to the network NT. It is noted that the communication interface 190 is an example of a communication I/F (interface) according to aspects of the present disclosure.

It is noted that the storage device 115 is not necessarily limited to devices/elements described above, but may be configured by each of or a combination of a RAM, a ROM, an EEPROM, an HDD, a portable storage medium such as a USB memory detachably attached to the management server 100, and a buffer provided to the processor 110.

The storage device 115 may be a computer-readable storage medium. The computer-readable storage medium is a non-transitory medium. The non-transitory medium includes, besides the above, a storage medium such as a CD-ROM or a DVD-ROM. Further, the non-transitory medium is also a tangible medium. The above applies to a storage device 215 of the MFP 200, which will be described later.
MFP (Multi-Function Peripheral)

The MFP 200 has multiple functions including, for example, a printing function, a scanning function and a copying function. The MFP 200 is owned, for example, by a user who is supposed to receive the prepaid print service. As shown in FIG. 1, the MFP 200 includes a processor 210, a storage device 215, a display 240, an operation panel 250, a conveyance mechanism 260, a communication interface 270, and a print engine 290, which are connected through a bus 205 so as to transmit/receive data thereamong.

The storage device 215 includes a volatile storage device 220 and a non-volatile storage device 230. The volatile storage device 220 is, for example, a DRAM, and has an image data storage area 222 to store image data subjected to be printed. The non-volatile storage device 230 is, for example, an NVRAM or a flash memory, and has a program storage area 231 and a data storage area 232. The program storage area 231 stores various programs, which include programs corresponding to processes based on sequence charts and/or flowcharts shown in FIGS. 4, 5, 9A, 9B, 14A, 14B, 16, and 18, and firmware such as a print processing program. The data storage area 232 stores the printable number of pages, and mode information indicating whether the MFP 200 operates in an auto charging mode or a manual charging mode.

The processor 210 is a device configured to perform data processing. The processor 210 is, for example, a CPU. The processor 210 is configured to execute various programs stored in the program storage area 231. It is noted that the processor 210 and the programs stored in the program storage area 231 constitute an example of a controller according to aspects of the present disclosure.

The display 240 is, for example, an LCD, which is configured to display various pieces of information. The operation panel 250 is a device configured to receive user operations. That is, the user can input various instructions to the MFP 200 by operating the operation panel 250. The communication interface 270 is a wired or wireless network interface to communicate with other devices, and is connected to the network NT.

The conveyance mechanism 260 is configured to convey the sheet S supplied from a tray which is configured to accommodate multiple sheets S. The print engine 290 is arranged on a conveyance passage of the sheet S conveyed by the conveyance mechanism 260, and is configured to form an image corresponding to a print job onto the sheet S conveyed by the conveyance mechanism 260. A printing method is not necessarily limited to a particular one, and may be, for example, an inkjet printing method or a laser printing method. The print engine 290 is configured to perform printing onto the sheet S in accordance with a print job transmitted from the terminal device 300 or a print job generated by the print engine itself based on the user operation of the operation panel 250.

Terminal Device

Figure 2:
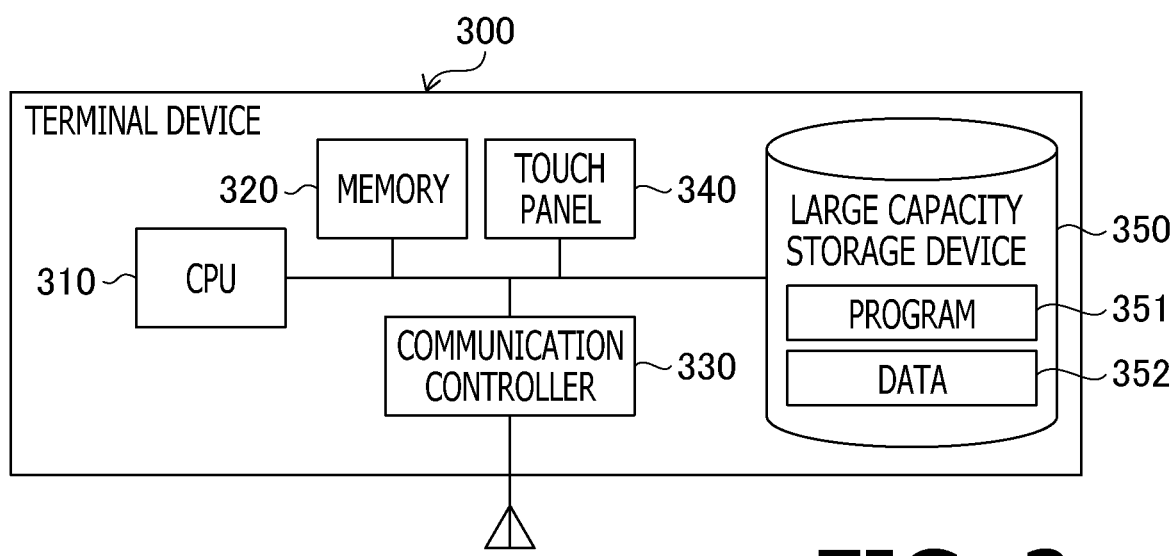
FIG. 2 is a block diagram showing an example of a configuration of a terminal device.

FIG. 2 shows an example of a configuration of the terminal device 300. The terminal device 300 is, for example, a portable terminal device such as a smartphone owned by the user, and is connected to the network NT through a wireless communication. As shown in FIG. 2, the terminal device 300 includes a CPU 310, a memory 320, a communication controller 330 connectable to the network NT via the wireless communication, a touch panel 340, and a large capacity storage device 350.

The large capacity storage device 350 is, for example, a flash memory, which is provided with a program storage area 351 and a data storage area 352. In the program storage area 351, various programs are stored, for example, as firmware. The CPU 310 is configured to execute the various programs stored in the program storage area 351. The CPU 310 is configured to perform various processes including a data communication with the management server 100 connected to the network NT.

With use of the touch panel 340 which is configured by integrally combining the LCD with a touchpad, the terminal device 300 displays various pieces of information, and receives various user operations. It is noted that the user can input various instructions to the terminal device 300 by operating the touch panel 340.

As the terminal device 300, other information terminal devices such as a tablet computer, a note PC, a desktop PC or the like may be used instead of the portable terminal device.

Transaction Server

As shown in FIG. 1, the transaction server 400 is connected to the network NT. The transaction server 400 is a server configured to perform an online payment via the network NT. The transaction server 400 is provided with a processor, a storage device, and a communication interface for connecting to the network NT. Since a configuration of the transaction server 400 is of the well-known type, details thereof will be omitted.

Pre-Paid Print Service

Figure 3:
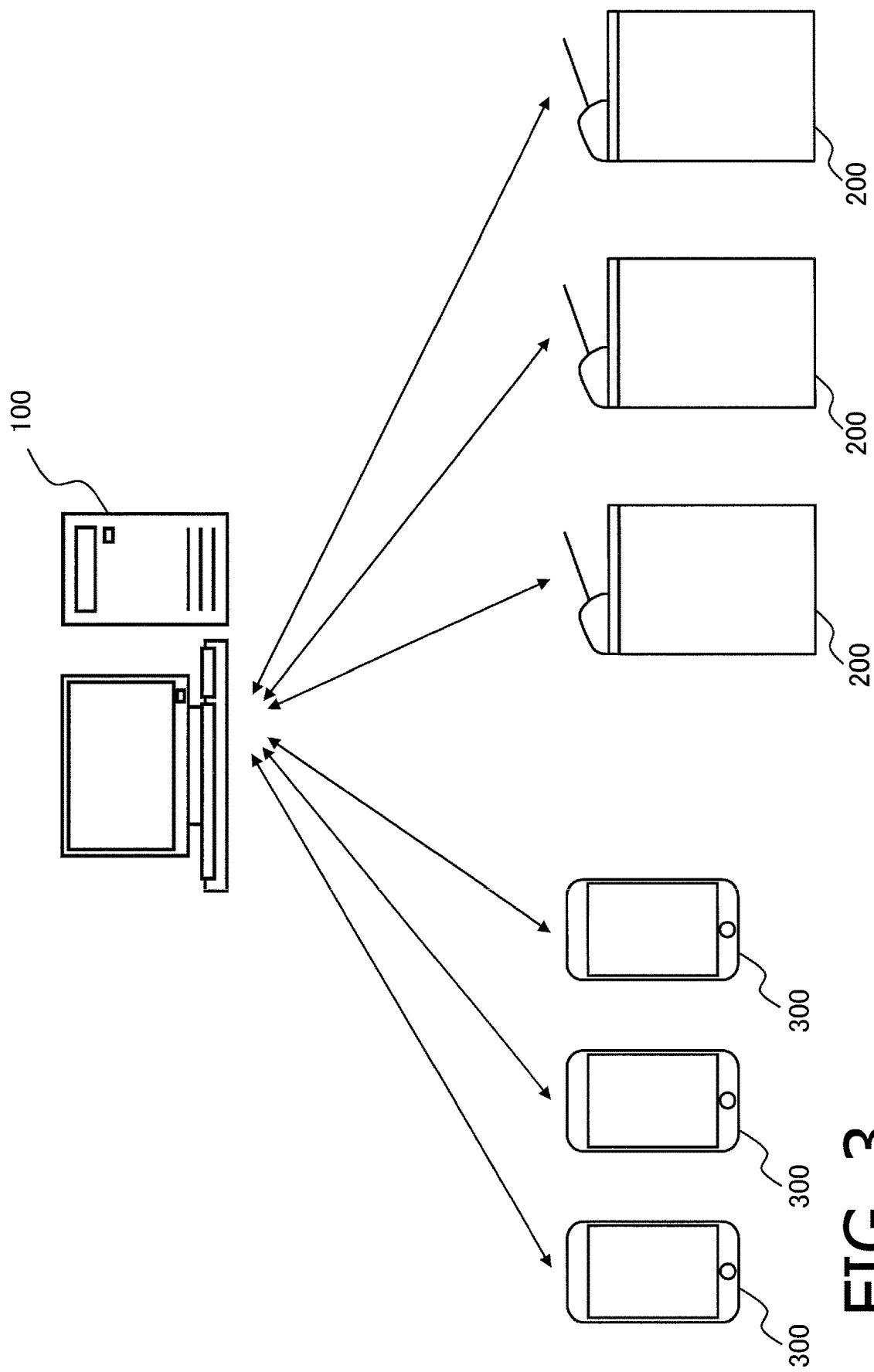
FIG. 3 shows an example of an information transmission/reception configuration employed in the print service providing system.

In the print service providing system 1 according to the present embodiment, each of the management server 100, the MFP 200, the terminal device 300 and the transaction server 400 is configured to transmit/receive information through the network NT. Information is transmitted/received such that, as shown in FIG. 3, multiple terminal devices 300 respectively owned by multiple users and multiple MFPs 200 installed at various locations are configured to transmit/receive information to/from the management server 100 individually. The management server 100 is configured to centrally manage events which are performed from the multiple terminal devices 300 and are directed to the multiple MFPs 200, respectively. It is noted that an "event" according to the present embodiment is purchasing or obtaining of printing privilege for a designated MFP 200, execution of printing, and the like. The management server 100 executes the events in accordance with an instruction from the terminal device 300, and/or automatically when a particular condition is satisfied.

In the present embodiment, a print service provided by the print service providing system 1 is the prepaid print service. The prepaid print service is a service in which the particular number of charged pages guaranteed by the printing privilege obtained by the user's financial burden is added to the printable number of pages of the target MFP 200, and the printing process on the relevant MFP 200 can be executed based on the updated printable number of pages. The addition of the number of charged pages to the printable number of pages is performed, for example, by the processor 110 and transmitted to the MFP 200, for example, at regular intervals. The printable number of pages is stored, for example, in the data storage area 232 of the non-volatile storage device 230 of the MFP 200, and is decreased by the number of printed pages each time printing is performed. The decrease of the printable number of pages is performed, for example, by the processor 210 and transmitted to the management server 100, for example, at regular intervals.

It is noted that the number of charged pages is an example of a guaranteed print amount, and the printable number of pages is an example of an allowed print amount.

In the print service providing system 1 according to the present embodiment, as one of purchasing types of the printing privilege, purchasing the printing privilege based on a purchase request in accordance with a user's manual operation is available. The purchasing of the printing privilege based on the user's purchase request is performed such that a purchase request of the printing privilege is transmitted from the terminal device 300 to the management server 100 based on the user's operation on the terminal device 300, and the thus transmitted request is received by the management server 100. The purchasing of the printing privilege based on the user's operation can be performed at any timing desired by the user. For example, the user may select one of several charge plans that differ from each other in price and unit of purchase (e.g., 500 yen for 50 pages, 900 yen for 100 pages, 2000 yen for 250 pages, and the like).

The user obtains the printing privilege corresponding to the charge plan the user selected such that the obtained printing privilege is associated with a printer ID of the MFP 200 designated by the user. As a result, the number of charged pages guaranteed by the obtained printing privilege is added to the printable number of pages for the MFP 200. It is noted that the printing privilege may be obtained in association with a user ID of the user, and the number of charged pages guaranteed by the printing privilege may be added to the printable number of pages associated with the user ID. In the following description, the purchasing of the printing privilege based on the purchase request in accordance with the manual operation by the user will be referred to as a "manual charging" as appropriate.

If the user needs to purchase the additional printing privilege by the manual charging every time the printable number of pages of the corresponding MFP 200 becomes low, the user operation would be a time-consuming and burdensome process for the user.

In the print service providing system 1 according to the present embodiment, as another purchasing type different from the manual charging described above, an automatic purchasing of the printing privilege that is not based on a purchase request by the user's manual operation is also available. According to the automatic purchasing, the number of charged pages guaranteed by the automatically purchased printing privilege is added to the printable number of pages of the corresponding MFP 200. The automatic purchasing of the printing privilege, which is not based on the user's manual purchase request, will be hereinafter referred to as an "auto charging" as appropriate.

In a state where the prepaid printing service is being provided to the user, when the management server 100 determines that a particular threshold condition has been satisfied, the auto charging is executed by the management server 100. That is, the timing at which the auto charging is executed is a timing at which the particular threshold condition is satisfied. According to the present embodiment, an example of the particular threshold condition is a condition in which the printable number of pages of the target MFP 200 becomes less than or equal to a certain threshold value, and the auto charging is performed at that timing. It is noted that, the "certain threshold" can be changed arbitrarily by the user according to the present embodiment.

Manual Charging Mode and Auto Charging Mode

The MFP 200 is configured such that its charging mode can be switched between the manual charging mode and the auto charging mode. The manual charging mode is a mode in which the number of charged pages corresponding to the printing privilege based on the purchase request according to the manual operation of the user is added to the printable number of pages. The auto charging mode is a mode in which the number of charged pages corresponding to the printing privilege automatically purchased not based on a purchase request according to a manual operation of the user is added to the printable number of pages.

As described above, according to the present disclosure, when "charging" is performed, a certain printing privilege is purchased, either manually or automatically, and a number of charged pages equivalent to the purchased printing privilege is added to the total count of the printable pages. In the following description, the above procedure may be described in a simplified manner. That is, in the following description, the term "charging" may be used without referring to the privilege and used as if the number of pages to be added to the total count of the printable pages is directly "purchased."

It is noted that the manual charging mode is an example of a first mode, the printing privilege based on the purchase request according to the manual operation is an example of a first printing privilege, and the number of charged pages set in the manual charging mode is an example of a first guaranteed print amount according to aspects of the present disclosure. Further, the auto charging mode is an example of a second mode, the printing privilege automatically purchased is an example of a second printing privilege, and the number of charged pages set in the auto charging mode is an example of a second guaranteed print amount according to aspects of the present disclosure.

The charging mode of the MFP 200 is set, for example, to the manual charging mode in its initial setting, and the charging mode can be switched to the auto charging mode in accordance with a request by the user. When the charging mode is switched to the auto charging mode, mode information representing that the current charging mode of the MFP 200 is the auto charging mode is stored in the data storage area 232 of the storage device 215 of the MFP 200. It is further noted that the charging mode of the MFP 200 can be returned from the auto charging mode to the manual charging mode in accordance with the request by the user. When the charging mode of the MFP 200 is switched from the auto charging mode to the manual charging mode, the mode information indicating that the charging mode is the auto charging mode, which is stored in the data storage area 232, is deleted, and the mode information indicating that the charging mode is the manual charging mode is stored in the data storage area 232. If, thereafter, the charging mode is further changed to the auto charging mode, the mode information representing the manual charging mode is deleted and the mode information representing the auto charging mode is stored in the data storage area 232.

Figure 4:
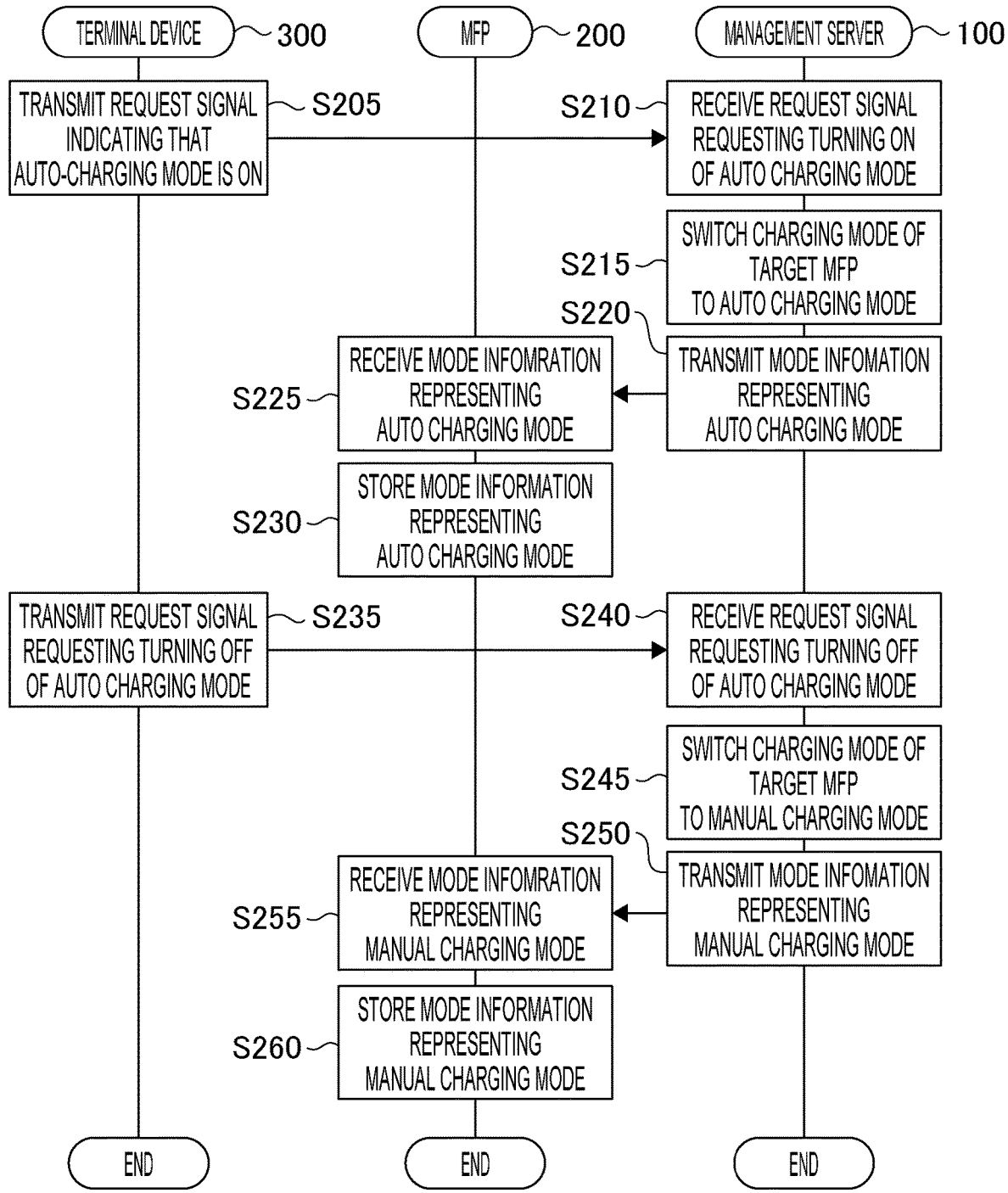
FIG. 4 is a sequence chart showing an example of control procedures performed by a processor of a management server, a processor of an MFP (multi-function peripheral) and a CPU of the terminal device when a charge mode of the MFP is switched between an auto charging mode and a manual charging mode.

FIG. 4 is a sequence chart illustrating an example of control procedures executed by the processor 110 of the management server 100, the processor 210 of the MFP 200 and the CPU 310 of the terminal device 300 when the charging mode is switched between the auto charging mode and the manual charging mode.

As shown in FIG. 4, when the user performs a particular operation, on the terminal device 300, to set the charging mode of the MFP 200 to the auto charging mode (i.e., to set the auto charging mode to ON), the CPU 310 of the terminal device 300 transmits (S205) a request signal to set the auto charging mode to ON in accordance with the particular operation by the user to the management server 100. The request signal contains information associated with ID information or information associated with the ID information of the MFP 200 that is the target of the request.

In S210, the processor 110 of the management server 100 receives the request signal, which is transmitted from the terminal device 300 and requests to set the auto charging mode to ON.

In S215, in response to the request signal to set the auto charging mode to ON, the processor 110 changes setting information regarding the target MFP 200 from information indicating the manual charging mode to information indicating the auto charging mode. It is noted that the setting information is information indicating the charging mode currently set to the target MFP 200 and is stored in the data storage area 132 of the management server 100.

In S220, the processor 110 transmits the mode information representing the auto charging mode to the MFP 200. The mode information may be, for example, a judgement flag enabling the processor 210 to determine that the charging mode is the auto charging mode.

In S225, the processor 210 receives the mode information transmitted from the management server 100. It is noted that, since the mode information transmitted in S20 represents the auto charging mode, the MFP 200 receives the mode information representing the auto charging mode in S25.

In S230, in response to receipt of the mode information representing the auto charging mode in S225, the processor 210 stores the received mode information, for example, in the data storage area 232 of the storage device 215. If the mode information representing the manual charging mode is stored in the storage area 232, the processor 210 deletes the mode information representing the manual charging mode from the data storage area 232.

When the user performs a particular operation, on the terminal device 300, to set the auto charging mode to OFF, the CPU 310 transmits a request signal to set the auto charging mode to OFF to the management server 100 in S235. The request signal contains the ID information or information associated with the ID information of the MFP 200 that is the target of the request.

In S240, the processor 110 of the management server 100 receives the request signal transmitted from the terminal device 300 and requesting to set the auto charging mode to OFF.

According to the present embodiment, when the auto charging mode is turned OFF, the manual charging mode is turned ON. Therefore, in response to the request signal to set the auto charging mode to OFF, the processor 110 changes the setting information regarding the target MFP 200 from information indicating the auto charging mode to information indicating the manual charging mode in S245.

charging mode to the target MFP 200. The mode information may be, for example, a judgment flag enabling the processor 210 to determine that the charging mode is the manual charging mode.

In S255, the processor 210 receives the mode information transmitted from the management server 100.

In S260, in response to receipt of the mode information representing the manual charging mode in S55, the processor 210 stores the mode information representing the manual charging mode in, for example, the data storage area 232 of the storage device 215. At this time, the processor 210 deletes the mode information representing the auto charging mode from the data storage area 232.

The processor 210 is configured to determine whether the charging mode of the MFP 200 is the auto charging mode or the manual charging mode based on the mode information stored in the data storage area 232. In other words, the mode information can be regarded as an example of addition type information representing the number of charged pages according to which of the manual charging mode and the auto charging mode is added to the printable number of pages.

Characteristic Features of Embodiment

According to the print service providing system 1 described above, the MFP 200 is configured such that the charging mode is switched between the manual charging mode and the auto charging mode. If a control related to an indication or an operation is switched in accordance with the selected charging mode, it would be convenient for the user. It is noted that the "indication" in this regard may include an indication on the display 240 of the MFP 200 and an indication on the touch panel 340 of the terminal device. Further, the "operation" in this regard may include an operation through the operation panel 250 of the MFP 200 and an operation through the touch panel 340 of the terminal device 300.

According to the present embodiment, the MFP 200 is controlled in different modes depending on whether the charging mode of the MFP 200 is the manual charging mode or the auto charging mode, thereby improving the convenience for the user. Hereinafter, a process of differentiating the control of the MFP 200 will be described in detail.

Procedure Performed when Control Mode is Switched

An example of a procedure performed by the processor 210 of the MFP 200 to realize the above-described configuration of differentiating a control mode will be described with reference to a flowchart shown in FIG. 5.

The control mode is a mode related to a control of an indication on the display 240 and/or on the touch panel 340, or an operation through the operation panel 250 and/or the touch panel 340. When the MFP 200 operates in the manual charging mode, the control mode to control the indication on the display 240 and/or the touch panel 340 or the operation through the operation panel and/or the touch panel 340 is a manual-charging operation mode. When the MFP 200 operates in the auto charging mode, the control mode to control the indication on the display 240 and/or the touch panel 340 or the operation through the operation panel and/or the touch panel 340 is an auto-charging operation mode.

Figure 5:
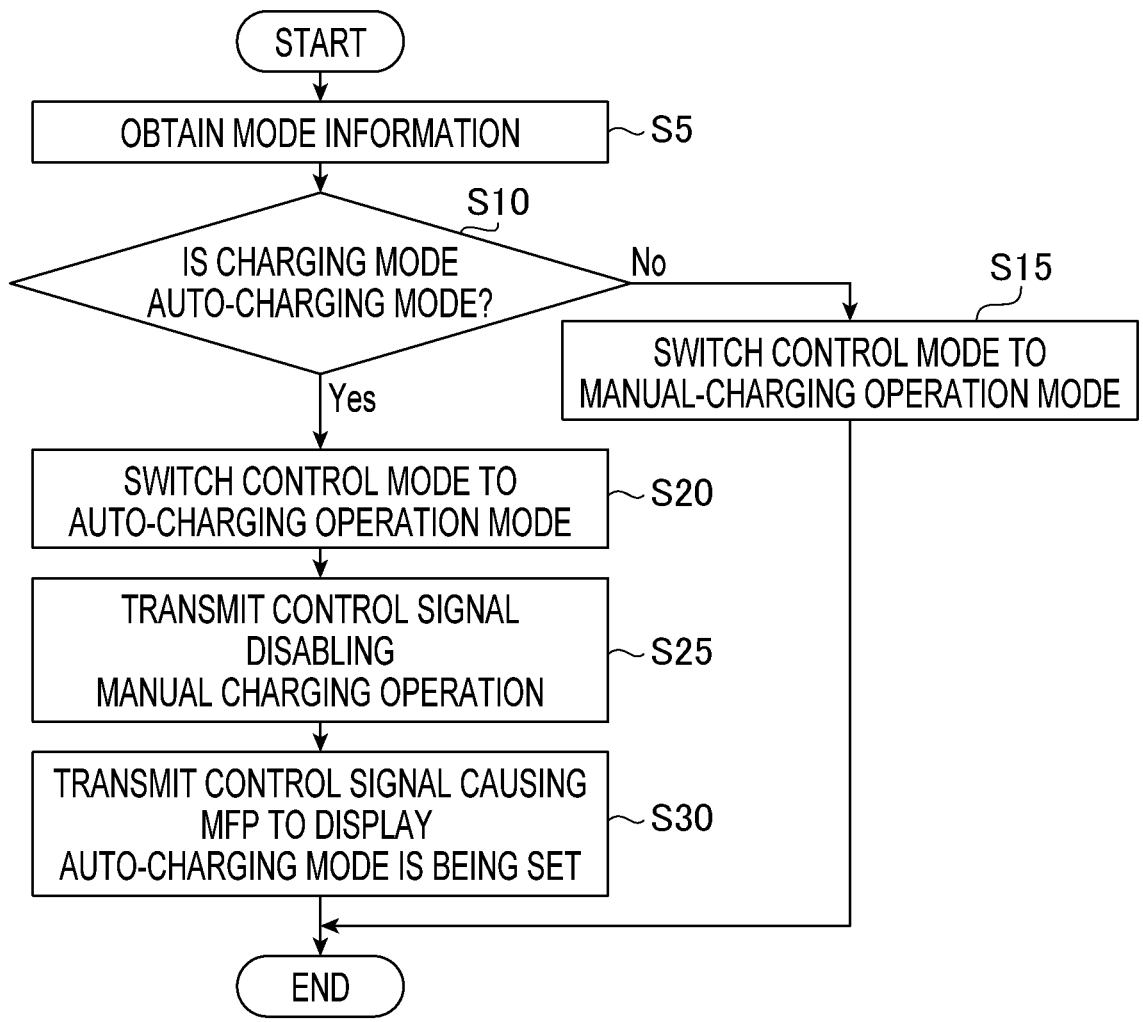
FIG. 5 is a flowchart illustrating an example of a controlling process performed by a processor of the MFP when a control mode of the MFP is switched.

It is noted that the process shown in FIG. 5 is executed, for example, when the MFP 200 is powered on, when the printing is started, when a dedicated application regarding the prepaid print service is started on the terminal device 300, or the like.

As shown in FIG. 5, the processor 210 obtains the mode information by, for example, reading the mode information stored in the data storage area 232. It is noted that S5 is an example of an obtaining process, and the MFP 200 executing S5 is an example of hardware configured to obtain addition type information representing a first or second guaranteed print amount according to aspects of the present disclosure.

In S10, the processor 210 determines whether the charging mode of the MFP 200 is the auto charging mode or not (i.e., the manual charging mode) based on the mode information obtained in S5. When the charging mode is the manual charging mode (S10: NO), the processor 210 proceeds to S15.

In S15, the processor 210 switches the control mode related to an indication on the display 240 or on the touch panel 340, or an operation through the operation panel 250 or the touch panel 340 to the manual-charging operation mode, which corresponds to the manual charging mode. It is noted that the manual-charging operation mode is an example of a first mode, and S15 is an example of a mode switching process according to aspects of the present disclosure. Further, the MFP 200 executing S15 is an example of hardware configured to switch a control mode according to aspects of the present disclosure.

When the charging mode of the MFP 200 is the auto charging mode (S10: YES), the processor 210 proceeds to S20.

In S20, the processor 210 switches the control mode related to the indication on the display 240 or on the touch panel 340, or the operation through the operation panel 250 or the touch panel 340 to the auto-charging operation mode, which corresponds to the auto charging mode. It is noted that the auto-charging operation mode is an example of a second mode, and S20 is an example of the mode switching process according to aspects of the present disclosure. Further, the MFP 200 executing S20 is an example of the hardware configured to switch the control mode according to aspects of the present disclosure.

In S25, the processor 210 transmits a control signal that disables a purchase request by a manual operation, on the touch panel 340, to perform a purchase request. For example, the processor 210 may transmit a control signal, to the terminal device 300, causing the terminal device 300 not to display indications necessary to execute the purchase request on the touch panel 340. Alternatively, the processor 210 may transmit a control signal, to the terminal device 300, invalidating the manual operation for the purchase request. The processor 210 may cause the operation panel 250, instead of or in addition to the touch panel 340, to disable the manual operation to execute the purchase request. It is noted that S25 is an example of an invalidating process according to aspects of the present disclosure.

In S30, the processor 210 transmits a control signal to the terminal device 300 to display, on the touch panel 340, that the auto charging mode is currently being set. The processor 210 may cause the display 240, instead of the touch panel 340, to display indications indicating that the auto charging mode is being set. Thereafter, the processor 210 terminates the flowchart shown in FIG. 5.

Concrete Examples of Indications on Terminal Device

Examples of a screen displayed on the touch panel 340 under the control of the processor 210 will be described. As comparative examples, examples of a screen displayed on the touch panel 340 when the above-described switching of the control mode is not performed are shown in FIGS. 6A-6D. That is, FIGS. 6A-6D show examples when the number of charged pages is added to the printable number of pages by the manual operation of the user when the charging mode is the manual charging mode.

When the user starts a dedicated application for the above-described prepaid printing service on the terminal device 300, a home screen 340A shown in FIG. 6A is displayed. On the home screen 340A, the printable number of pages of the MFP 200 of which the printer ID available to the user in question is "Printer01" is displayed, along, for example, with a doughnut graph showing the printable number of pages. The home screen 340A also displays a "Charge" button allowing the user to instruct the MFP 200 to perform the manual charging.

When the user operates the "Charge" button on the home screen 340A, the screen is changed to a home screen 340B shown in FIG. 6B. On the home screen 340B, buttons representing "50 pages/500 JPY," "100 pages/900 JPY," "250 pages/2000 JPY," "1000 pages/6000 JPY," and "1500 pages/7500 JPY" are indicated as selectable plans of the manual charging. By selecting one of the six kinds of charge plans, the user can designate the plan to be used when the manual charging is performed. In the example shown in FIG. 6B, the plan of "100 pages/900 JPY" is being selected.

On the home screen 340B, when the user selects any of the selectable plans and operates the "Charge" button, the screen is changed to a card information input screen 340C shown in FIG. 6C. In the card information input screen 340C, the user inputs credit card information (e.g., a card number, an expiration date and the like) necessary for an online payment. As is widely known, when the user has registered the card information in advance on another screen (not shown), the card information input screen 340C may be omitted.

When the user has input the credit card information on the card information input screen 340C and operates a "Confirm" button, the screen is changed to an updated home screen 340D, which represents the home screen after the charging has been completed, shown in FIG. 6D. On the home screen 340D, the printable number of pages after the number of charged pages corresponding to the charge plan selected on the home screen 340B has been added is displayed. In the example shown in FIG. 6D, the number of charged pages (i.e., 100 pages) is added to the printable number of pages before the charging (i.e., 700), and the resulting printable number of pages (i.e., 800 pages) is indicated.

Figure 7A:
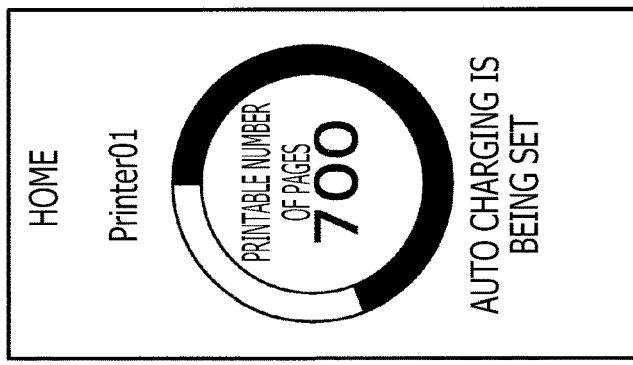
FIGS. 7A and 7B show examples of a home screen displayed on the touch panel of the terminal device when a disabling process is performed.
Figure 7B:
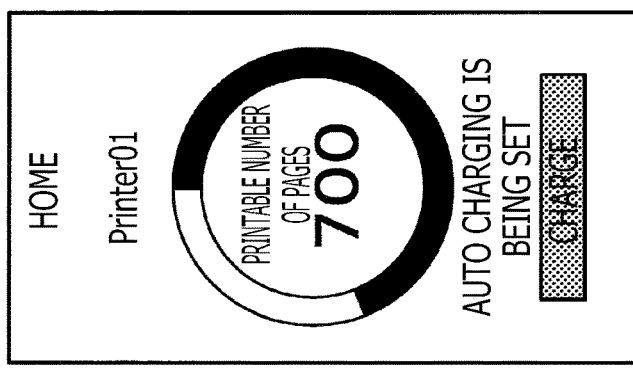

FIGS. 7A and 7B show examples of the home screen 340A displayed on the touch panel 340 of the terminal device 300 when S25 of FIG. 5 is executed. In the example shown in FIG. 7A, the "Charge" button is grayed out so that the user cannot operate the same. In the example shown in FIG. 7B, the home screen 340A does not show the "Charge" button. In this way, and the MFP 200 is operated in the auto charging mode, it is impossible for the user to change the home screen 340A to the home screen 340B, and the purchasing of the number of pages to be charged by the manual operation of the user can be prevented. The configurations shown in FIGS. 7A and 7B are only examples, and various modifications can be employed. For example, the "Charge" button may be displayed on the home screen 340A but the manual operation thereof may be disabled such that nothing happens even if the user operates the "Charge" button.

Figure 8A:
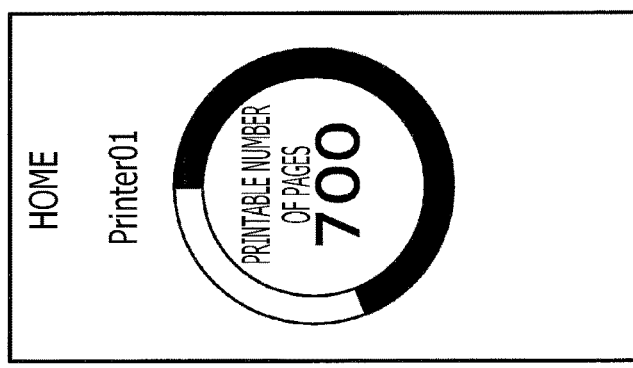
FIGS. 8A and 8B show examples of the home screen displayed on the touch panel of the terminal device when an indication switching process to display that the current mode is the auto charging mode is performed.
Figure 8B:
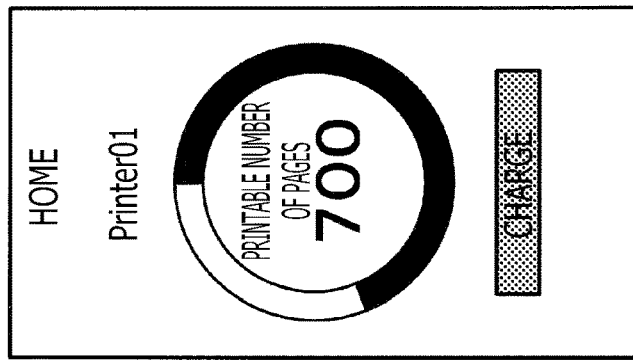

FIGS. 8A and 8B show examples of the home screen 340A displayed on the touch panel 340 of the terminal device 300 when S30 of FIG. 5 is executed. In FIG. 8A, which corresponds to FIG. 7A, the "Charge" button is grayed out, and further, a text saying "Auto Charge is Currently Set" is indicated. In FIG. 8B, which corresponds to FIG. 7B, the "Charge" button is not displayed, and further the text "Auto Charge is Currently Set" is displayed as in FIG. 8A. In this way, it is possible to have the user recognize that the current state of the system 1 is a state in which the number of pages to be charged will be purchased automatically.

Control Procedure when Printing is Performed

Figure 9A:
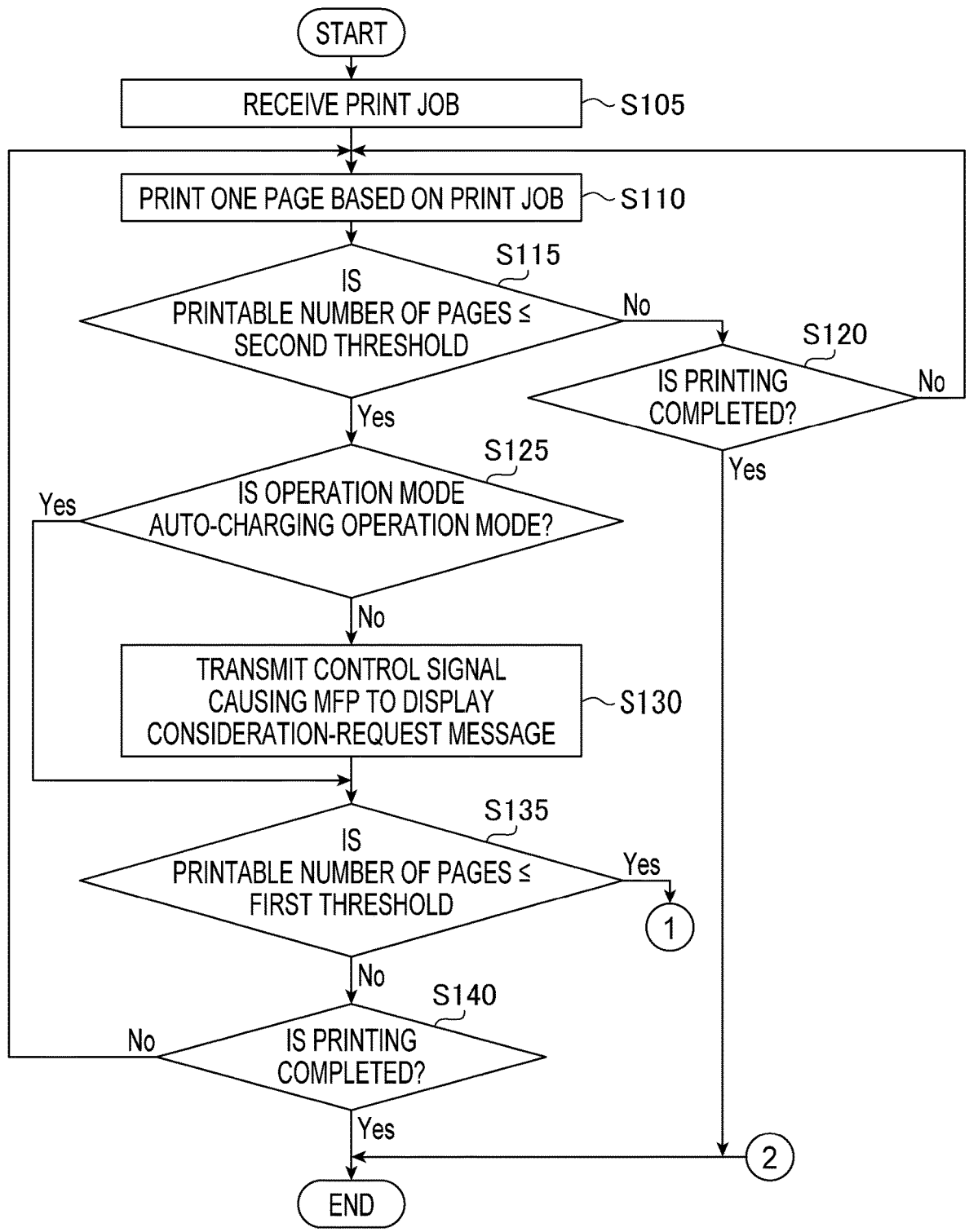
FIGS. 9A and 9B show a flowchart illustrating a control process performed by a processor of the MFP when printing is performed.
Figure 9B:
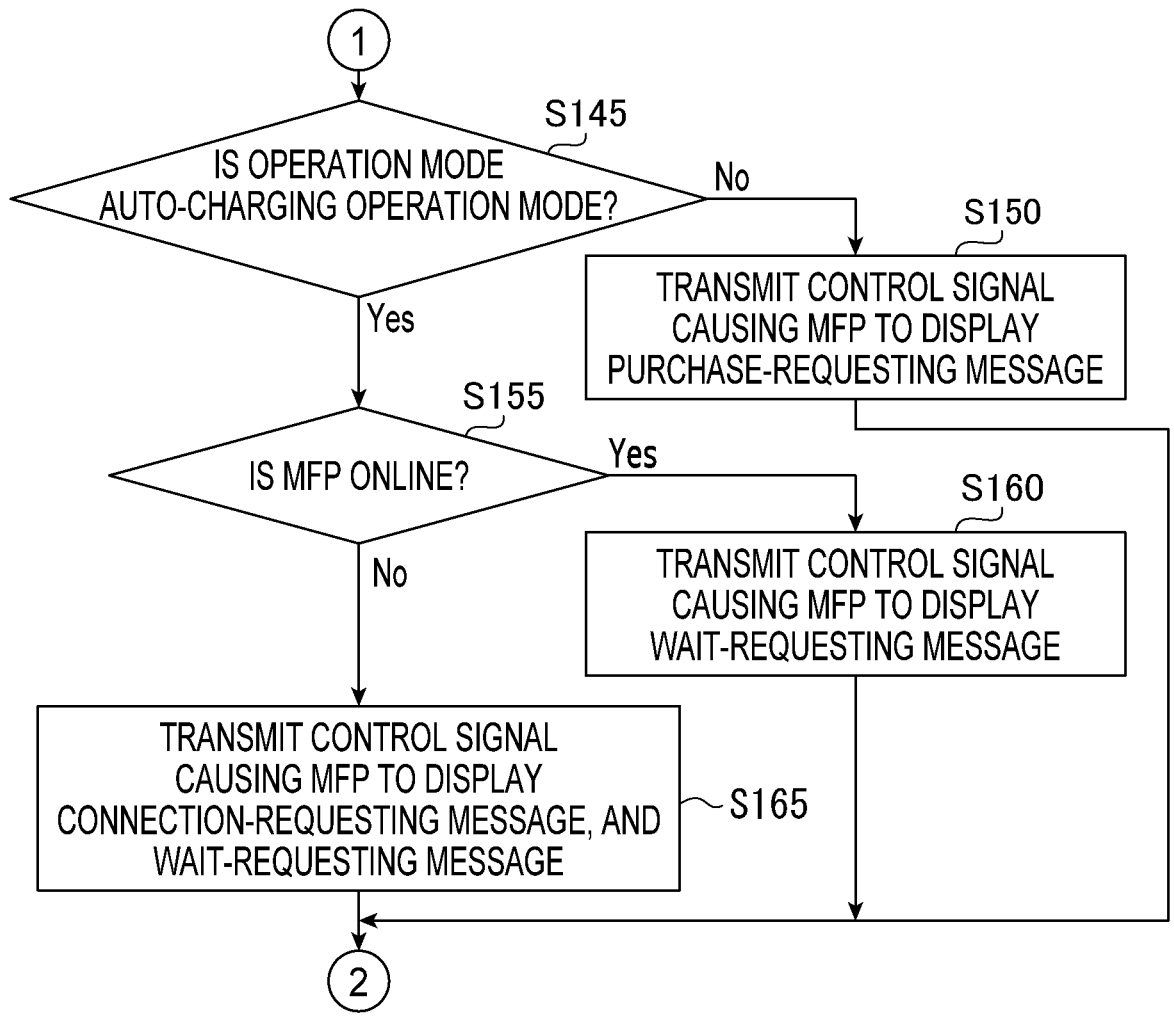

Next, an example of a control procedure performed by the processor 210 of the MFP 200 when the printing is performed will be described with reference to a flowchart shown in FIGS. 9A and 9B.

In S105, the processor 210 receives a print job transmitted from the terminal device 300. It is noted that, when the user inputs a print instruction by operating the operation panel 250, the processor 210 may be configured to obtain the print job based on the user operations of the operation panel 250.

In S110, the processor 210 performs printing based on the print job received in S105 for one sheet. In association with the printing of one page, the processor decreases the printable number of pages by one.

In S115, the processor 210 determines whether the printable number of pages is equal to or less than a particular second threshold. The second threshold is not limited to a particular value as far as it is larger than a first threshold referred to in S135 described later. For example, the second threshold is 30. It is noted that S115 is an example of a second determining process. When the printable number of pages is greater than the second threshold (S115: NO), the processor 210 proceeds to S120.

In S120, the processor 210 determines whether all the pages according to the print job have been printed. When all the pages have not been printed (S120: NO), the processor 210 returns to S110. When all the pages have been printed (S120: YES), the processor 210 terminates the process shown in FIGS. 9A and 9B.

It is noted that, when it is determined in S115 that the printable number of pages is less than or equal to the second threshold (S115: YES), the processor 210 proceeds to S125.

In S125, the processor 210 determines whether the control mode is the auto-charging operation mode or not (i.e., the manual-charging operation mode). When the control mode is the manual-charging operation mode (S125: NO), the processor 210 proceeds to S130.

In S130, the processor 210 transmits a control signal causing the terminal device 300 to display, on the touch panel 340, a consideration-prompting message prompting the user to consider purchasing of the number of pages to be charged by a manual operation. An example of the consideration-prompting message may be "The printable number of pages is relatively small. Do you want to charge?" The processor 210 may cause the MFP 200 to display the consideration-prompting message on the display 240 instead of the touch panel 340 of the terminal device 300. Thereafter, the processor 210 proceeds to S135.

When the control mode is the auto-charging operation mode (S125: YES), the processor 210 proceeds to S135. In this case, since S130 is skipped, the processor 210 does not transmit a control signal, to the terminal device 300, to cause the terminal device 300 to display the consideration-prompting message as described above on the touch panel 340.

In S135, the processor 210 determines whether the printable number of pages is less than or equal to the first threshold. The first threshold is typically zero, but may be a value other than zero. When, for example, the auto charging mode is set and the automatic purchasing of a certain number of pages to be charged is expected, the first threshold may be set to a particular negative value taking the particular number of pages to be charged expected to be purchased by the auto charging into consideration. It is noted that S135 is an example of a first determining process according to aspects of the present disclosure. When the printable number of pages is greater than the first threshold (S135: NO), the processor 210 proceeds to S140.

In S140, the processor 210 determines whether all the pages according to the print job have been printed. When all the pages have not been printed (S140: NO), the processor 210 returns to S110. When all the pages have been printed (S140: YES), the processor 210 terminates the process shown in FIGS. 9A and 9B.

When the printable number of pages is less than or equal to the first threshold (S135: YES), the processor 210 proceeds to S145.

In S145, the processor 210 determines whether the control mode is the auto-charging operation mode. When the control mode is the manual-charging operation mode (S145: NO), the processor 210 proceeds to S150.

In S150, the processor 210 transmits, to the terminal device 300, a control signal causing the terminal device 300 to display, on the touch panel 340, a purchase-prompting message prompting the user to purchase the number of pages to be charged by a manual operation. The purchase-prompting message may be, for example, "The printable number of pages is running low. Please charge." The processor 210 may cause the MFP 200 to display the purchase-prompting message on the display 240 instead of the touch panel 340 of the terminal device 300. Thereafter, the processor 210 terminates the process shown in FIGS. 9A and 9B.

When the control mode is the auto-charging operation mode (S145: YES), the processor 210 proceeds to S155.

In S155, the processor 210 determines whether the MFP 200 is online with respect to the management server 100 that manages the printing privilege. When the MFP 200 is online with respect to the management server 100 (S155: YES), the processor 210 proceeds to S160. It is noted that S155 is an example of a third determining process according to aspects of the present disclosure.

In S160, the processor 210 transmits, to the terminal device 300, a control signal causing the terminal device 300 to display a wait-asking message asking the user to wait until the auto charging is completed. The wait-asking message is, for example, a message saying "Please wait until the auto charging is finished" or the like. It is noted that the processor 210 may cause the MFP 200 to display the wait-asking message on the display 240 of the MFP 200 in addition to or instead of the touch panel 340 of the terminal device 300.

When the MFP 200 is offline with respect to the management server 100 (S155: NO), the processor 210 proceeds to S165.

In S165, the processor 210 transmits, to the terminal device 300, a control signal causing the terminal device 300 to display a connection-requesting message prompting the user to communicably connect the MFP 200 to the management server 100 and the wait-asking message on the touch panel 340. An example of a message including the connection-requesting message and the wait-asking message is "Please connect the printer to the Internet and wait until the auto charging is completed". The processor 210 may cause the MFP 200 to display the connection-requesting message and the wait-asking message on the display 240 of the MFP 200 in addition to or instead of the touch panel 340 of the terminal device 300. Thereafter, the processor 210 terminates the process shown in FIGS. 9A and 9B.

In steps S25, S30, S130, S150, S160, and S165 above, the processor 210 of the MFP 200 performs the following process. The processor 210 outputs a control signal to switch the display content displayed on the touch panel 340 of the terminal device 300 or the display 240 of the MFP 200, depending on whether the control mode is switched to the manual-charging operation mode or the auto-charging operation mode. It is sufficient that, at least one of S25, S30, S130, S150, S160, or S165 may be provided, while one or more of these steps may be omitted. Therefore, one or more of the above steps S25, S30, S130, S150, S160 and S165 are examples of an indication switching process.

Concrete Examples of Indications on Terminal Device

Figure 10:
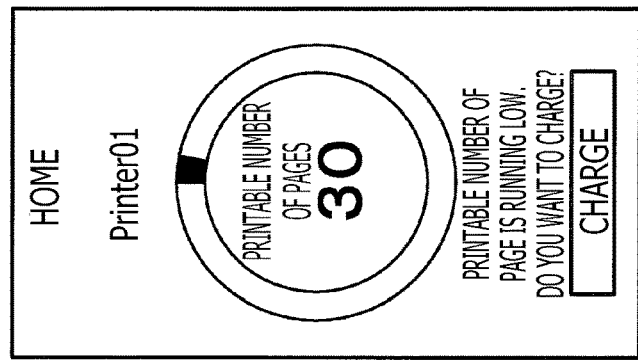
FIG. 10 shows an example of the home screen displayed on the touch panel of the terminal device when a process to display a consideration-prompting message prompting a user to consider a purchase request is performed.

An example of a screen displayed on the touch panel 340 under the control of the processor 210 of the MFP 200 will be described. FIG. 10 shows a concrete example of the home screen 340A displayed on the touch panel 340 when S130 (FIG. 9A) is executed. In the example shown in FIG. 10, a message "The printable number of pages is running low. Do you want to charge?" is indicated as the consideration-prompting message since, for example, the printable number of pages has reached the second threshold (e.g., 30 pages) in the manual-charging operation mode.

In this way, the user can recognize that a manual operation to purchase the number of pages to be charged should be performed shortly. It is noted that, in a state where the control mode is the auto-charging operation mode, when the printable number of pages is equal to or less than the first threshold, the purchasing of the number of pages to be charged is automatically performed to increase the printable number of pages and the printing will not be stopped. For this reason, according to the present embodiment, when the printable number of pages becomes the second threshold (e.g., 30 pages) which is greater than the first threshold, the consideration-prompting message is displayed on the home screen 340A, thereby avoiding unnecessary anxiety for the user.

Figure 11:
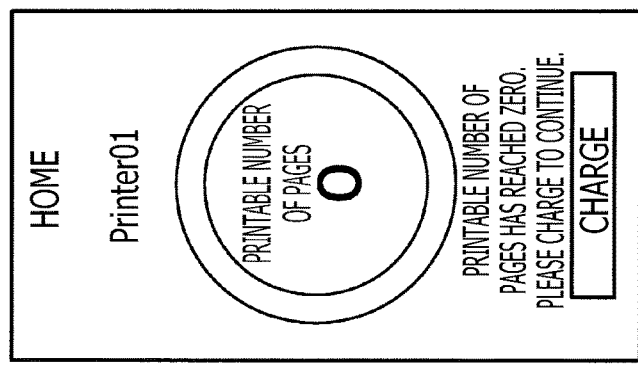
FIG. 11 shows an example of the home screen displayed on the touch panel of the terminal device when a process to display a purchase-requesting message prompting the user to perform the purchase request is performed.

FIG. 11 shows a concrete example of the home screen 340A displayed on the touch panel 340 when S150 (FIG. 9B) is executed. In the example shown in FIG. 11, a message "The printable number of pages has reached zero. Please charge." is displayed as the purchase-prompting message since the printable number of pages in the manual-charging operation mode has reached the first threshold (e.g., zero).

Figure 12:
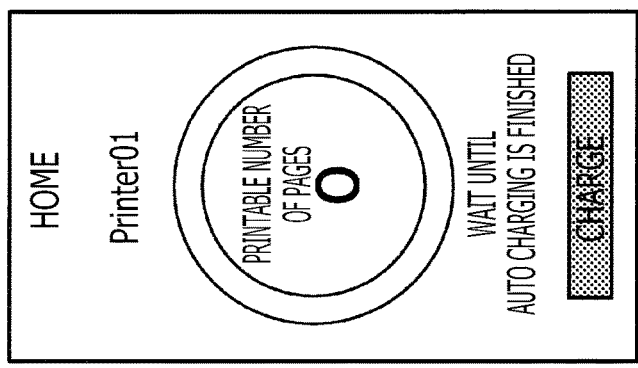
FIG. 12 shows an example of the home screen displayed on the touch panel of the terminal device when a process to display a wait-asking message asking the user to wait until the auto charging is done is performed.

FIG. 12 shows a concrete example of the home screen 340A displayed on the touch panel 340 when S160 (FIG. 9B) is executed. In the example shown in FIG. 12, as the printable number of pages has reached the first threshold (i.e., zero) when the MFP 200 is in the online state and the control mode is the auto-charging operation mode, a message "Please wait until the auto charging is finished." as the wait-asking message. It is noted that the example shown in FIG. 12 corresponds to FIG. 7A described above and the "Charge" button is grayed out. In this way, the user can wait until the auto-charging is completed without having to perform the manual operation for purchasing the charging number of pages, thereby ensuring a smooth process. It is noted that the "Charge" button need not be grayed out.

Figure 13:
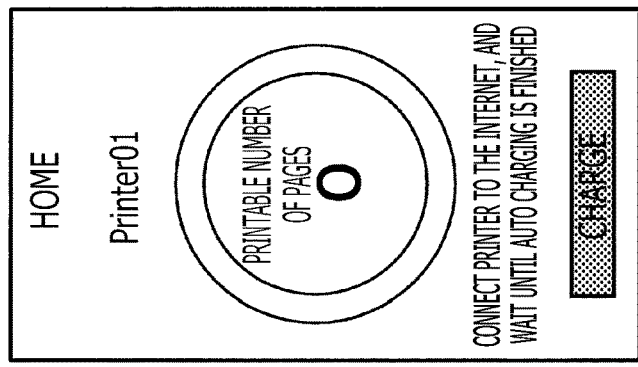
FIG. 13 shows an example of the home screen displayed on the touch panel of the terminal device when a process to display a connection-requesting message asking the user to connect the terminal device to the Internet and the wait-asking message asking the user to wait is performed.

FIG. 13 shows a concrete example of the home screen 340A displayed on the touch panel 340 when S165 (FIG. 9B) is executed. In the example shown in FIG. 13, as the printable number of pages has reached the first threshold (i.e., zero) when the MFP 200 is in the offline state and the control mode is the auto-charging operation mode, the connection-requesting message and the wait-asking message are displayed. An example a message including the connection-requesting message and the wait-asking message is "Please connect the printer to the Internet and wait until the auto charging is finished." In this way, it is possible to prompt the user to resolve the offline state of the MFP 200 with respect to the management server 100. Further, the user is notified that the auto charging is performed when the connection is established. As a result, it is ensured that the auto purchasing of the charging number of pages is performed. It is noted that the example shown in FIG. 13A corresponds to FIG. 7A described above, and the "Charging" button is grayed out. However, the "Charge" button does not need to be grayed out.

Effects of Embodiment

In the MFP 200, the processor 210 executes S5. In S5, the mode information is obtained. The mode information represents which one of the number of charged pages purchased in the manual charging mode and the number of charged pages purchased in the auto charging mode is added to the printable number of pages of the MFP 200.

Based on the obtained mode information, the processor 210 executes S15 or S20. In S15 or S20, the control mode of the MFP 200 is switched to the manual-charging operation mode or the auto-charging operation mode. When the number of charged pages is obtained based on the manual operation of the user in the manual charging mode, the control mode is switched to the manual-charging operation mode. When the number of charged pages is automatically purchased without the manual operation of the user, in the auto charging mode, the control mode is switched to the auto-charging operation mode.

According to the present embodiment, between a case where the number of pages to be charged is purchased based on the manual operation of the user and a case where the number of pages to be charged is automatically purchased, the MFP 200 is controlled in different modes. Therefore, according to the MFP 200 described above, convenience for the user is improved.

When the control mode is switched to the auto-charging operation mode, the processor 210 performs a process disabling the manual charging operation in S25, thereby purchasing of the number of pages to be charged by the manual operation being disabled. According to the present embodiment, in a state where the number of pages to be charged is expected to be purchased in the auto-charging operation mode, a case where the user performs the manual operation by mistake to purchase the number of pages to be charged unnecessarily can be avoided.

In the present embodiment, S25 may be modified such that an indication enabling the user to manually operate to purchase the number of pages to be charged may not be performed. In this way, the user is prevented from purchasing the number of pages to be charged by the manual operation. According to such a configuration, in a state where the number of pages to be charged is automatically purchased in the auto-charging operation mode, it is possible to prevent the user from purchasing, by mistake, the number of pages to be charged by the manual operation.

Alternatively, in the present embodiment, S25 may be modified such that, even if the user performs a manual operation to purchase the number of pages to be charged, the operation may be disabled and not function effectively. In this way, the user is prevented from purchasing the number of pages to be charged by the manual operation. According to such a configuration, in a state where the number of pages to be charged is expected to be automatically purchased in the auto-charging operation mode, it is possible to prevent the user from purchasing the number of pages to be charged by the manual operation by mistake.

Furthermore, in the present embodiment, the displayed contents on the touch panel 340 of the terminal device 300 or the display 240 of the MFP 200 are differentiated from each other depending on when the number of pages to be charged is purchased based on the manual operation by the user or automatically without the user operation. Therefore, according to the MFP 200, convenience for the user can be improved.

In the present embodiment, the touch panel 340 of the terminal device 300 or the display 240 of the MFP 200 is configured to indicate that the current control mode is the auto-charging operation mode. Therefore, it is possible to have the user recognize that the number of pages to be charged is to be automatically purchased. According to the present embodiment, it is possible to prevent the user from purchasing the number of pages to be charged by the manual operation by mistake.

In the present embodiment, it is determined whether the printable number of pages is less than or equal to the first threshold (e.g., zero or less than but close to zero) in S135. When the printable number of pages becomes small, the determination in S135 is affirmative.

When the control mode has been switched to the auto-charging operation mode, the printable number of pages is increased as the charging number of pages to be charged is automatically purchased. In S160 or S165, the wait-request message is displayed on the touch panel 340 of the terminal device 300 or the display 240 of the MFP 200. Therefore, the user can wait without performing the manual operation for purchasing the number of pages to be charged until the completion of the auto purchasing.

When the operation mode has been switched to the manual-charging operation mode, the printable number of pages is to be increased by the manual operation of the user. In S150, the purchase-prompting message is displayed on the touch panel 340 of the terminal device 300 or the display 240 of the MFP 200. Accordingly, the user can perform a manual operation for purchasing the number of pages to be charged to increase the printable number of pages.

In the present embodiment, it is determined whether the printable number of pages is the second threshold or less in S115. The second threshold is, for example, a value larger than the first threshold by a particular amount. When the printable number of pages is decreased by a certain amount as the printing by the MFP 200 is performed, the determination in S115 becomes affirmative.

When the control mode has been switched to the manual-charging operation mode, it will become necessary soon to increase the printable number of pages by the manual operation of the user. In S130, the consideration-prompting message prompting the user to consider the purchasing of the number of pages to be charged on the touch panel 340 of the terminal device 300 or the display 240 of the MFP 200. In this way, the user can recognize that the manual operation to purchase the number of pages to be charged shortly.

When the control mode has been switched to the auto-charging operation mode, even when the printable number of pages is decreased largely in the near future, the number of pages to be charged will be purchased automatically at that timing. As a result, the printable number of pages will be increased, and the printing will not be disabled. Therefore, when the determination in S125 is "YES," the consideration-request message will not be displayed on the touch panel 340 of the terminal device 300 or the display 240 of the MFP 200 to avoid causing unnecessary anxiety to the user.

According to the present embodiment, even if the control mode has been switched to the auto-charging operation mode, when the MFP 200 is unable to communicate information with the management server 100, the automatic purchasing of the number of pages to be charged cannot be performed. Therefore, it is determined in S155 whether the MFP 200 is online with respect to the management server 100. When the operation mode is the auto-charging control mode but the MFP 200 is not online with respect to the management server 100, the connection-prompting message is displayed on the touch panel 340 of the terminal device 300 or the display 240 of the MFP 200. According to the present embodiment configured as above, it is possible to encourage the user to resolve the offline state of the MFP 200 with respect to the management server 100. Thus, it is ensured that the automatic purchasing of the number of pages to be charged is performed.

Modifications

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are provided below.

Aspects of the present disclosure are not necessarily limited to the above-described embodiment, but various modifications can be made without departing from aspects of the present disclosure. Such modifications will be described hereafter.

(1) A Case where Switching from the Manual Charging Mode to the Auto Charging Mode is Requested In the above embodiment, when the determination in S135 is "YES" and the control mode has been switched to the manual-charging operation mode, the purchase-prompting message is displayed on the touch panel 340 or the display 240. However, the configuration is not necessarily limited to the above, but, for example, switching from the manual charging mode to the auto charging mode may be requested.

Figure 14A:
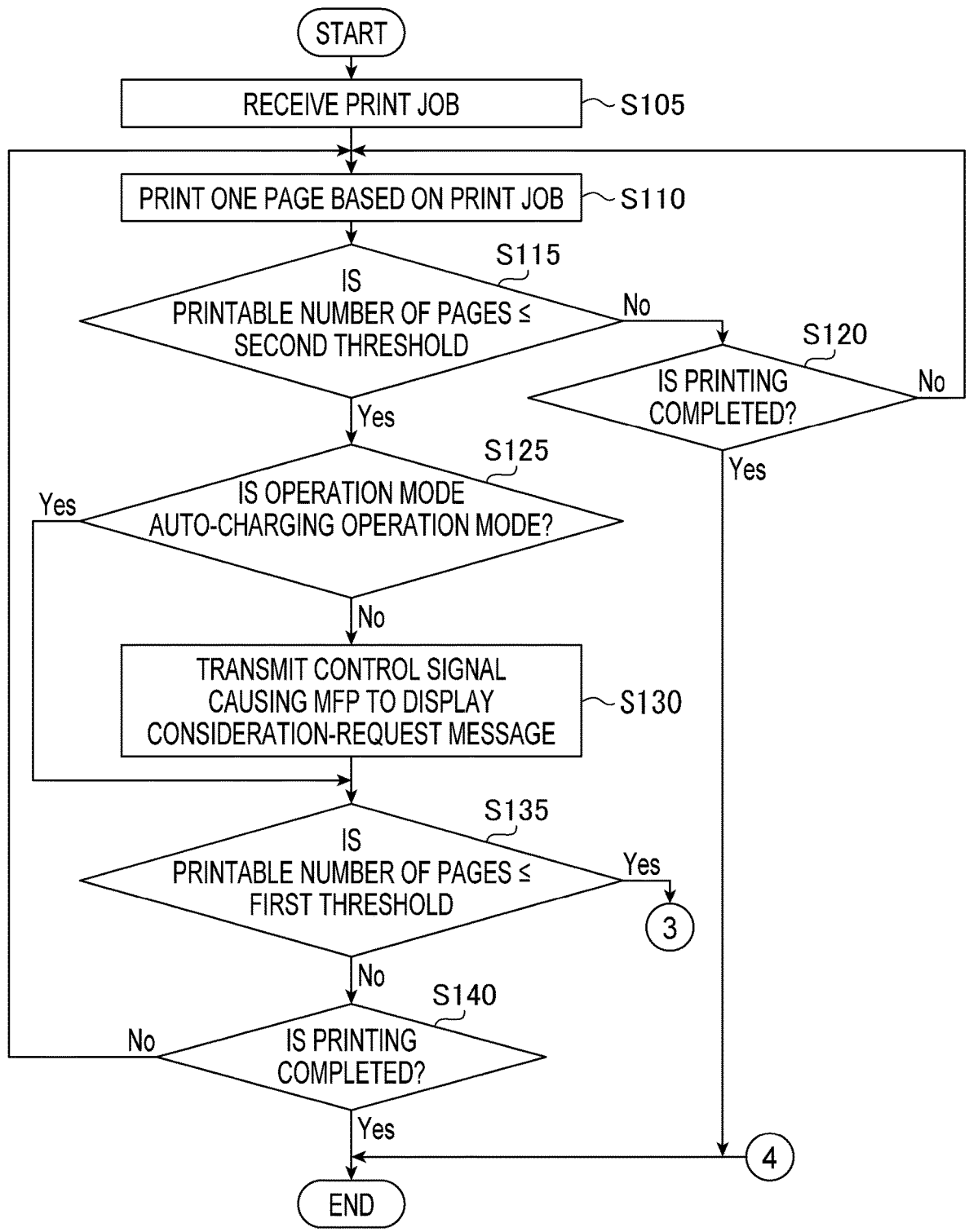
FIGS. 14A and 14B show a flowchart illustrating an example of a control process performed by a processor of the MFP when printing is performed in a modification in which switching from the manual charging mode to the auto charging mode is requested.
Figure 14B:
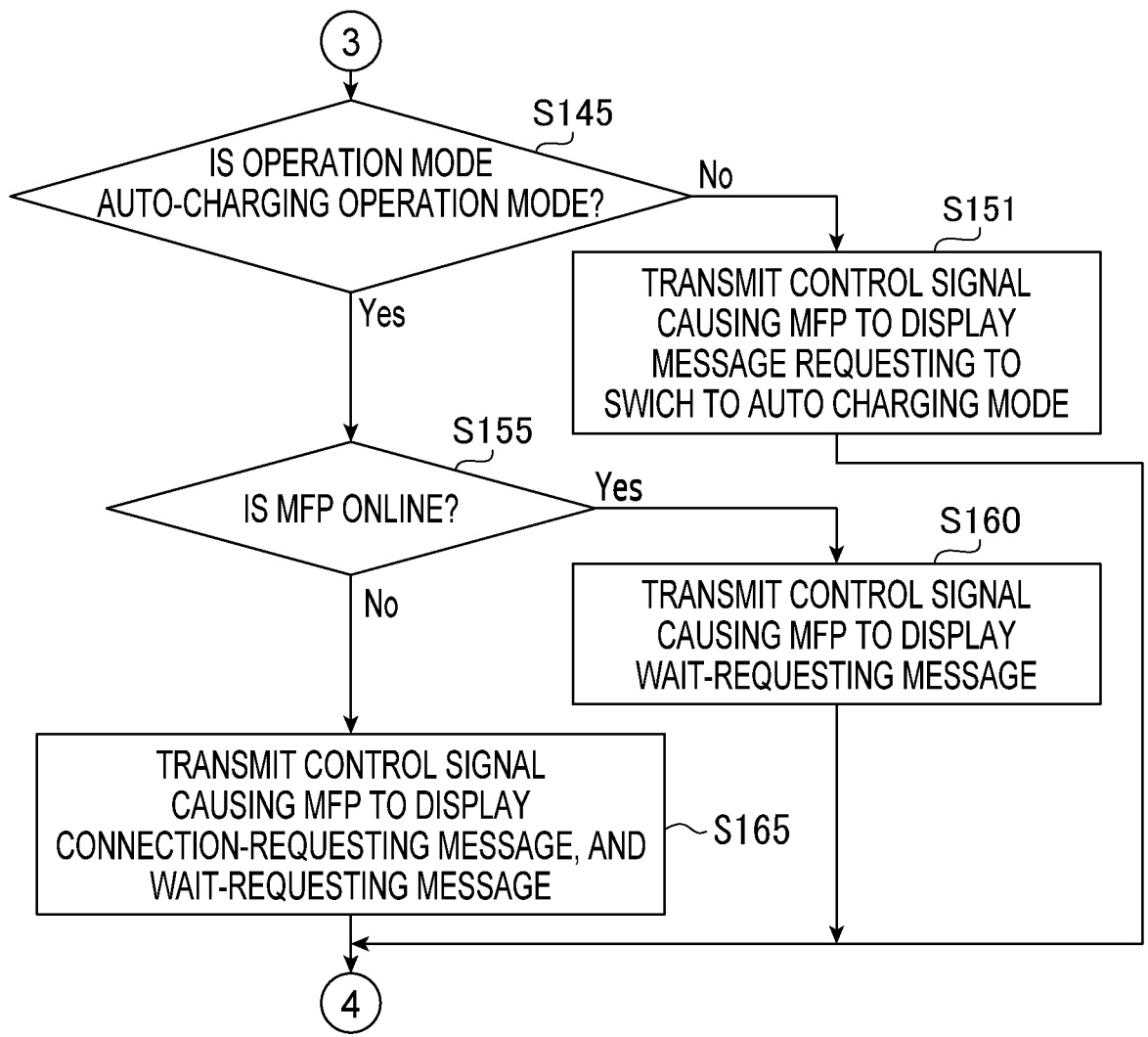

FIGS. 14A and 14B show a flowchart illustrating an example of a process performed by the processor 210 of the MFP 200 when the printing is performed in the present modification. The flowchart shown in FIGS. 14A and 14B is different from the flowchart shown in FIGS. 9A and 9B in that S151 is executed in FIG. 14B instead of S150 in FIGS. 9A and 9B. The other steps S105-S145 and S155-S165 in FIGS. 14A and 14B are same as those in FIGS. 9A and 9B and the description thereof will be omitted.

When the control mode is the manual-charging operation mode (S145: NO), the processor 210 proceeds to S151.

In S151, the processor 210 transmits, to the terminal device 300, a control signal causing the terminal device 300 to display, on the touch panel 340, a request message to request the user to switch the charging mode to the auto charging mode. The request message to request the user to switch the charging mode is, for example, "It is recommendable to switch to the auto charging" and the like. It is noted that the processor 210 may display such a request message on the display 240 of the MFP 200 in addition to or instead of the touch panel 340 of the terminal device 300. It is noted that S151 is also an example of the indication switching process. After the execution of S151, the process shown in FIGS. 14A and 14B is terminated.

Figure 15:
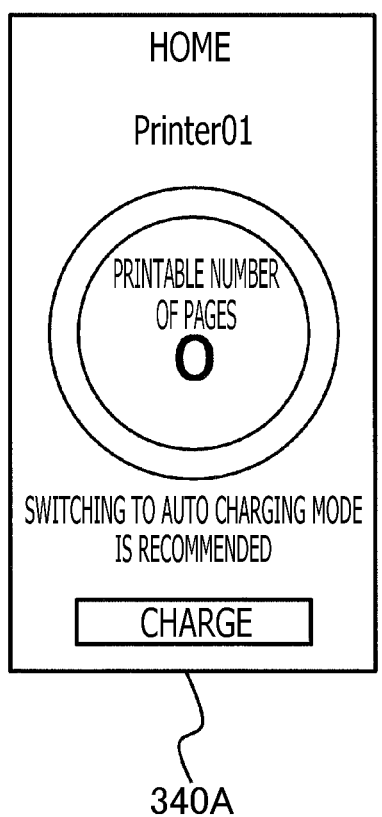
FIG. 15 shows an example of the home screen displayed on the touch panel of the terminal device when a process to display a message encouraging the user to perform a mode switching operation is performed.

FIG. 15 shows a concrete example of the home screen 340A displayed on the touch panel 340 when S151 of FIG. 14B is executed. In the example shown in FIG. 15, as the printable number of pages reaches the first threshold (e.g., zero) in the manual-charging operation mode, a message, for example, "It is recommendable to switch to the auto charging" is displayed as the request message to request the user to perform a switching operation.

According to the modification, when the charging mode is changed from the manual charging mode to the auto charging mode, the number of pages to be charged can be automatically purchased. Therefore, it becomes unnecessary for the user to perform manual operations to increase the printable number of pages. According to the present modification, in S151, the consideration-requesting message encouraging the user to perform the switching operation to switch the charging mode to the auto charging mode is displayed on the touch panel 340 or the display 240. Therefore, according to the present modification, the printable number of pages can be increased without requiring the user to perform the manual operation to purchase the number of pages to be charged.

(2) A Case where the Number of Printable Pages is Displayed or not is Switched According to the Control Mode In the above-described embodiment, the MFP 200 displays the printable number of pages regardless of whether the charging mode of the MFP 200 is the manual charging mode or the auto charging mode. However, the configuration is not necessarily limited to the above. For example, the printable number of pages may not be displayed when the charging mode is the auto charging mode.

Figure 16:
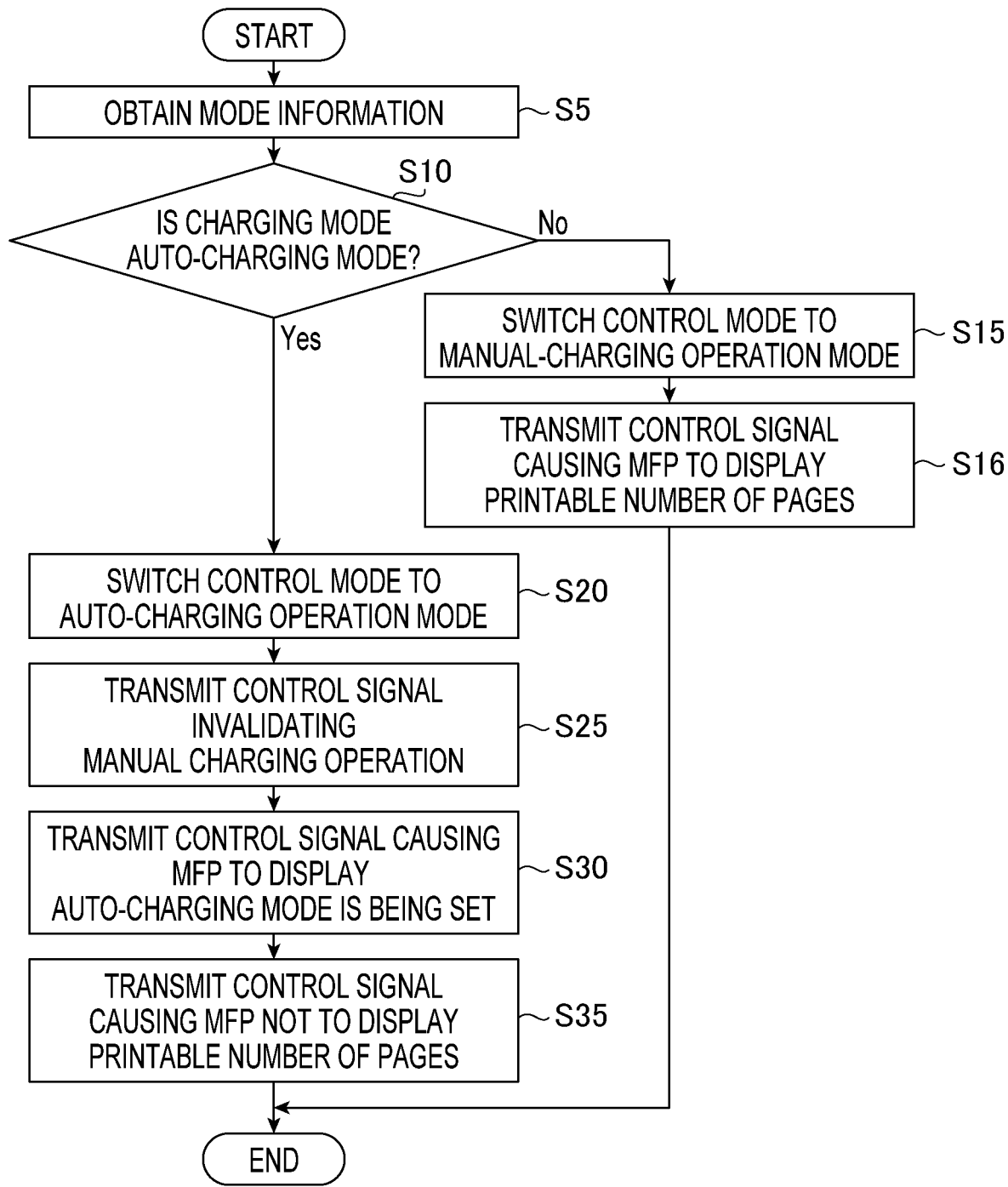
FIG. 16 is a flowchart illustrating an example of a control process performed by the processor of the MFP when the control mode of the MFP is switched in a modification in which whether the printable number of pages is displayed or not is determined depending on the control mode.

FIG. 16 shows a flowchart illustrating an example of a process executed by the processor 210 when the control mode is switched in this modification. The flowchart shown in FIG. 16 differs from the flowchart shown in FIG. 5 above in that S16 is executed after S15 and S35 is executed after S30 in FIG. 16. The other steps S5-S15 and S20-S30 in FIG. 16 are similar to those in FIG. 5 and therefore the description thereof is omitted.

After executing S15, the processor 210 proceeds to S16.

In S16, the processor 210 transmits, to the terminal device 300, a control signal causing the terminal device 300 to cause the touch panel 340 to display the printable number of pages. It is noted that the processor 210 may display the printable number of pages on the display 240 of the MFP 200 in addition to or instead of the touch panel 340 of the terminal device 300. It is noted that S16 is also an example of the indication switching process. After the execution of S16, the process shown in FIG. 16 is terminated.

After execution of S30, the processor 210 proceeds to S35.

In S35, the processor 210 transmits, to the terminal device 300, a control signal causing the terminal device not to display the printable number of pages on the touch panel 340, and the processor 210 does not transmit a control signal, to the terminal device 300, causing the terminal device 300 to display the printable number of pages on the touch panel 340. It is noted that the processor 210 may be configured not to display the printable number of sheets on the display 240 of the MFP 200 in addition to or instead of the touch panel 340 of the terminal device 300. It is noted that S35 is also an example of the indication switching process. After execution of S35, the processor 21 terminates the process shown in FIG. 16.

It is noted that, according to the present modification, at least one of S25 or S30 may be unexecuted.

Figure 17A:
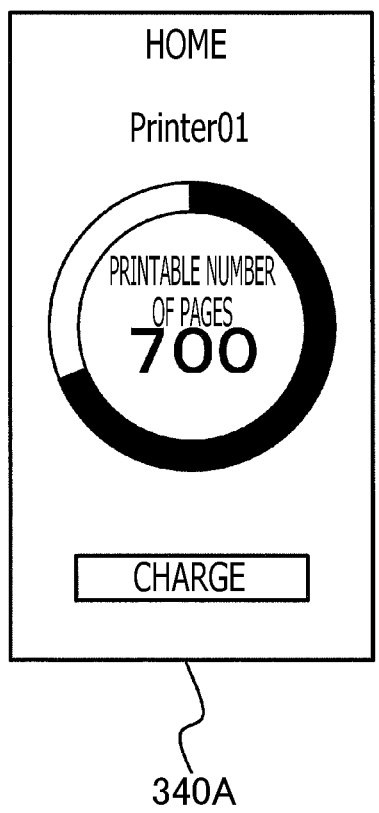
FIGS. 17A and 17B show examples of the home screen displayed on the touch panel of the terminal device in the modification in which whether the printable number of pages is displayed or not is determined depending on the control mode.

FIG. 17A shows a concrete example of the home screen 340A displayed on the touch panel 340 when S16 of FIG. 16 is executed. In the example shown in FIG. 17A, the printable number of pages (700 pages, in this example) is displayed on the home screen 340A.

Figure 17B:
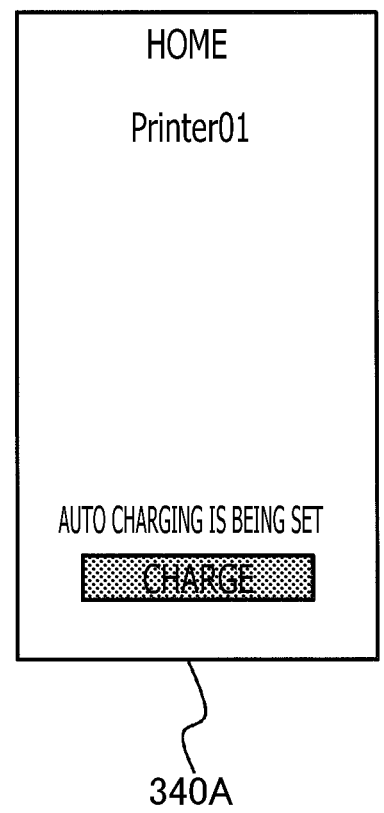

FIG. 17B shows a concrete example of the home screen 340A displayed on the touch panel 340 when S35 of FIG. 6 is executed. In the example shown in FIG. 17B, the printable number of pages is not displayed on the home screen 340A. It is noted that FIG. 17B corresponds to FIG. 8A, and in FIG. 17B, the "Charge" button is grayed out while a text indicating "Auto-Charging is Currently Set" is displayed. It is noted that at least one of the gray-out of the "Charge" button or the display of the "Auto-Charging is Currently Set" may be omitted.

In the present modification, in the manual-charging operation mode, the purchasing of the number of pages to be charged based on the manual operation is performed. Therefore, in the manual-charging operation mode, the user needs to know the current printable number of pages. On the other hand, in the auto-charging operation mode, the user does not necessarily know the current printable number of pages since the number of pages to be charged is automatically purchased.

According to the present modification, only when the operation mode is the manual-charging operation mode, the printable number of pages is displayed on the touch panel 340 or the display 240. Since the printable number of pages, which is not necessarily displayed when the control mode is the auto-charging operation mode, is omitted in the auto-charging operation mode, the convenience for the user is improved.

(3) A Case where a Display Mode of the Printable Number of Pages is Changed Depending on the Control Mode In the above-described embodiment, regardless of whether the charging mode of the MFP 200 is the manual charging mode or the auto charging mode, a display mode of the printable number of pages is the same. However, the configuration is not necessarily limited to this. For example, the display mode of the printable number of pages may be changed depending on whether the charging mode of the MFP 200 is the manual charging mode or the auto charging mode.

Figure 18:
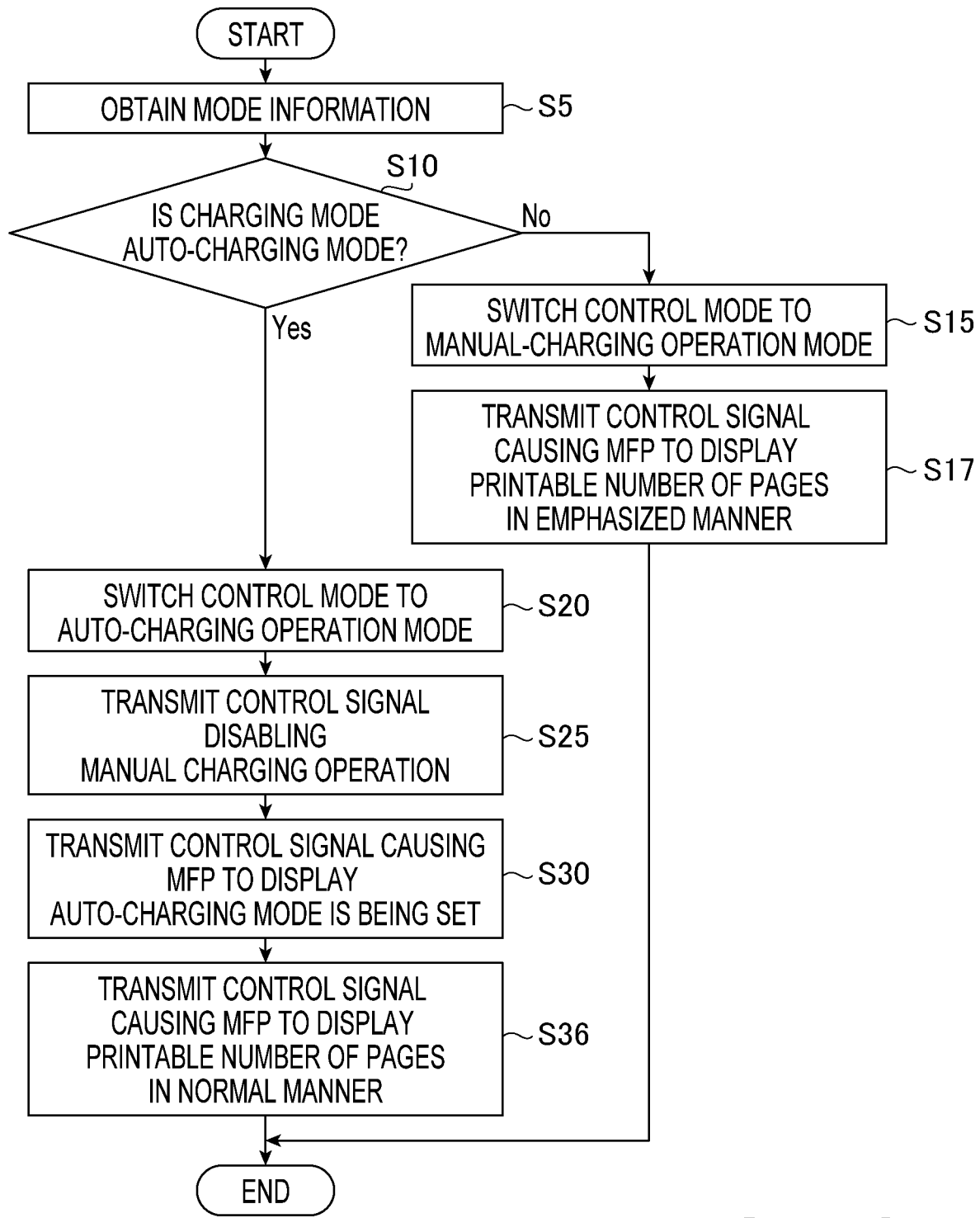
FIG. 18 is a flowchart illustrating an example of the control process performed by the processor of the MFP when the control mode of the MFP is switched in a modification in which a displaying mode is changed depending on the control mode.

FIG. 18 is a flowchart showing an example of a process performed by the processor when the control mode is switched according to the present modification. The flowchart shown in FIG. 18 is different from the flowchart shown in FIG. 5 in that, in FIG. 18, S17 is executed after S15 and S36 is executed after S30. The other steps of S5-S15 and S20-S30 are the same as those in FIG. 5 and the description thereof will be omitted.

After execution of S15, the processor 210 proceeds to S17.

In S17, the processor 210 transmits, to the terminal device 300, a control signal causing the terminal device 300 to display the printable number of pages in a particularly emphasized manner on the touch panel 340. The particularly emphasized manner is not necessarily limited to a particular manner, and, for example, in an enlarged manner, in a bolded manner, in a manner where a font is changed, in a particularly colored manner (e.g., in red), in a manner where a background color is changed to a particular emphasizing color, in a manner where a mark and/or a figure for emphasis is added, and the like. The processor 210 may cause the MFP 200 to display the printable number of pages in a particularly emphasized manner, on the display 240 of the MFP 200 instead of or in addition to the touch panel 340 of the terminal device 300. It is noted that S17 is an example of the indication switching process according to aspects of the present disclosure. After S17, the processor 210 terminates the process shown in FIG. 18.

After executing S30, the processor 210 proceeds to S36.

In S36, the processor 210 transmits, to the terminal device 300, a control signal causing the terminal device 300 to display the printable number of pages on the touch panel 340 in a normally displaying manner. The normally displaying manner is a manner in which the above-described emphasis is not applied. The processor 210 may display the printable number of pages in the normally displaying manner on the display 240 of the MFP 200 in addition to or instead of the touch panel 340 of the terminal device 300. It is noted that S36 is also an example of the indication switching process according to aspects of the present disclosure. After S36, the processor 210 terminates the process shown in FIG. 18.

It is noted that, according to the present modification, at least one of S25 or S30 may be unexecuted.

Figure 19A:
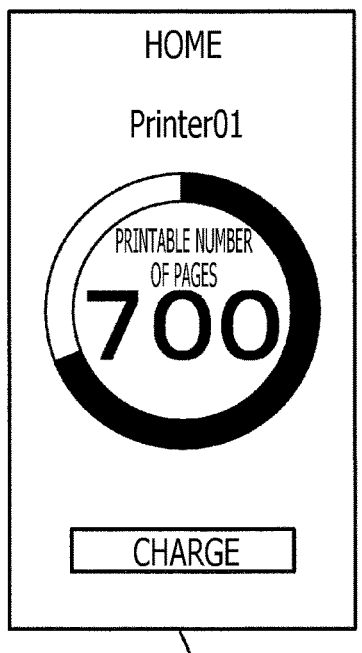
FIGS. 19A and 19B show examples of the home screen displayed on the touch panel of the terminal device in the modification in which the displaying mode is changed depending on the control mode.

FIG. 19A shows a concrete example of the home screen 340A displayed on the touch panel 340 when S17 of FIG. 18 is executed. In the example shown in FIG. 19A, the number (i.e., "700") representing the printable number of pages is indicated in an emphasized manner (i.e., in an enlarged manner with respect to a usual size) on the home screen 340A.

Figure 19B:
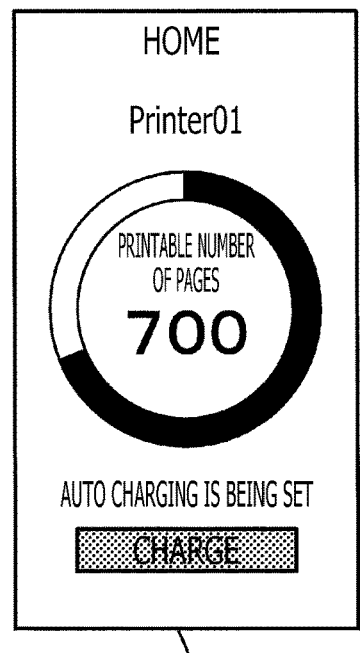

FIG. 19B shows a concrete example of the home screen 340A displayed on the touch panel 340 when S36 of FIG. 18 is executed. In the example shown in FIG. 19B, the number (i.e., "700") representing the printable number of pages is indicated in an ordinary manner. The example shown in FIG. 19B corresponds to FIG. 8A, and the "Charge" button is grayed out and a text "Auto Charging is being set" is displayed. It is noted that, according to the present modification, one of the gray-out of the "Charge" button or the indication of "Auto Charging is being set" may be omitted.

According to the present modification, when the control mode is the manual-charging operation mode, the number of pages to be charged based on the manual operation is purchased. Therefore, in the manual-charging operation mode, it is important for the user to know the current printable number of pages. On the other hand, in the auto-charging operation mode, it is not so important for the user to know the current printable number of pages since the number of pages to be charged is automatically purchased when necessary.

According to the present modification, the printable number of pages is displayed in the normally displaying manner in the auto-charging operation mode, while the printable number of pages is displayed in the emphasized manner in the manual-charging operation mode. Thus, according to the present modification, by displaying the printable number of pages in more emphasized manner in the manual-charging operation mode than in the auto-charging operation mode, convenience for the user is enhanced.

(4) A Case where Credit-Related Information is Displayed when the Auto-Charging is Completed When, for example, the number of pages to be charged is purchased in the manual-charging operation mode, credit-related information regarding the payment is not displayed, while when the number of pages to be charged is purchased in the auto-charging operation mode, the credit-related information regarding the payment may be displayed.

In the present modification, when the number of pages to be charged is purchased in the auto-charging operation mode, the processor 210 transmits a control signal, to the terminal device 300, to cause the terminal device 300 to display the credit-related information regarding the payment for the auto purchasing on the touch panel 340. The credit-related information includes, for example, a notification of completion of payment with a credit card, a balance notification, a notification of payment incompleteness due to insufficient balance, or the like. It is noted that the processor 210 may cause the credit-related information to be displayed on the display 240 of the MFP 200 in addition to or instead of the touch panel 340 of the terminal device 300. Although such a process is not described with reference to a flowchart since it is a well-known process, such a process is also an example of the indication switching process.

Figure 20:
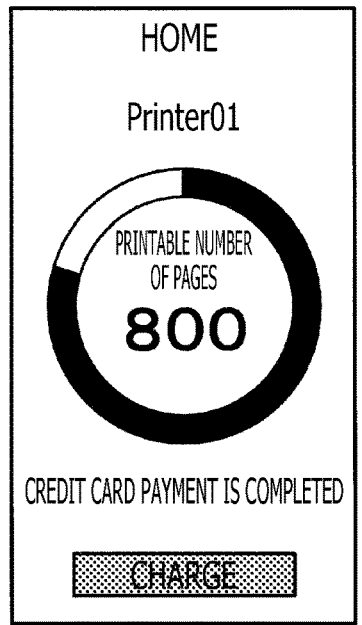
FIG. 20 shows an example of the home screen displayed on the touch panel of the terminal device in a modification in which credit-related information is displayed when the auto charging is completed.

FIG. 20 shows a concrete example of a home screen 340D displayed on the touch panel 340 of the terminal device 300 after the charging of the printable number of pages performed. In the example shown in FIG. 20, the home screen 340D shows that the printable number of pages has been increased to 800 pages, and a text "Payment with Credit Card has been completed" is indicated as the credit-related information. It is noted that the example shown in FIG. 20 corresponds to FIG. 7A, and the "Charge" button is grayed out. It is noted that the "Charge" button may not be grayed out. When the number of pages to be charged is purchased based on the manual operation in the manual-charging operation mode, the home screen 340D as shown in FIG. 6D is displayed. In this case, the credit-related information is not displayed.

Automatic purchasing of the number of pages to be charged in the auto-charging operation mode is performed in accordance with a payment process based on the user's credit, for example, automatic debit from a user's account or credit card under a user's name. According to the present modification, in the auto-charge operation mode in which the automatic purchasing is performed, the credit-related information related to the above payment is displayed on the touch panel 340 of the terminal device 300 or on the display 240 of the MFP 200. According to the present modification, the user can be assured as the user can confirm that the payment for the automatic purchase of the number of pages to be charged has been performed without any problems.

(5) Miscellaneous

According to the above configuration, the user can know which of the number of charged pages based on the manual-charging mode or the auto-charging mode is added to the printable number of pages based on the mode information retrieved from the storage device 215. However, the configuration is not necessarily limited to the above. For example, the processor 210 of the MFP 200 may inquire the management server 100 at an appropriate timing. According to such a configuration, it is unnecessary to store the mode information. The appropriate timing may be a timing when the MFP 200 is powered on, when the printing is started, when a dedicated application regarding the prepaid printing service is started on the terminal device 300, or the like.

In the above configurations, whether the MFP 200 is connected to the management server 100 is determined only when the operation mode of the MFP 200 is the auto-charging operation mode. However, the configurations are not necessarily limited to the above, but whether the MFP 200 is connected to the management server 100 is determined even when the control mode of the MFP 200 is the manual-charging operation mode. In such a case, when the MFP 200 is connected to the management server 100, the purchase-requesting message may be displayed on the touch panel 340 and/or the display 240, while both the connection-requesting message and the purchase-requesting message may be displayed on the touch panel 340 and/or the display 240 when the MFP 200 is not connected to the management server 100.

At least a part of the processes performed by the processor 210 of the MFP 200 as described above may be performed by the processor 110 of the management server 100 or the CPU 310 of the terminal device 300. For example, S5, which is an example of the obtaining process, may be performed by the processor 110 of the management server 100 or the CPU 310 of the terminal device 300. In such a modification, the management server 100 or the terminal device 300 serves as an example of a hardware for performing the obtaining process. Further, S15 or S20, which is an example of the mode switching process, may be performed by the processor 110 of the management server 100 or the CPU 310 of the terminal device 300. In such a case, the management server 100 or the terminal device 300 serves as an example of a hardware for performing the mode switching process.

Further, although the above description is made in the case where the printing device is the MFP 200, the configuration is not necessarily limited to the above. That is, the printing device according to aspects of the present disclosure may be, for example, a printer or a copier.

In the above description, when external dimensions or sizes are described as "identical," "equal," "different," such descriptions are not meant to be strictly accurate. That is, the terms "identical," "equal," and "different" mean "substantially identical," "substantially equal," and "substantially different," with design and manufacturing tolerances and errors being allowed for. However, when there is a description of a particular value that serves as a particular determination criterion or delimiter, such as a threshold value (see flowcharts in FIG. 5, FIGS. 9A and 9B, FIGS. 14A and 14B, FIG. 16, and FIG. 18) or a reference value, "identical," "equal," "different," and the like for those values are strictly meant.

The flowcharts shown in FIGS. 4, 5, 9A, 9B, 14A, 14B, 16, and 18 are not limited to the procedures shown in the respective flowcharts, but procedures may be added, deleted, or changed to the extent that a purpose and/or technical concept of the aspects of the present disclosure are not departed from.

In addition to what has already been described above, methods according to the above embodiment and each of the modifications may be used in combination as appropriate.

In addition, although examples are not given, the present disclosure may be implemented with various modifications within the scope of not departing from the intent of aspects of the present disclosure.

What is claimed is:

1. A printing device comprising:
   a print engine; and
   a controller,
   wherein the printing device is configured to perform printing with an allowed print amount, and
   wherein the controller is configured to:
      obtain addition type information representing a first guaranteed print amount or a second guaranteed print amount, the first guaranteed print amount corresponding to a first printing privilege to be purchased based on a purchase request due to a manual operation by a user, the second guaranteed print amount corresponding to a second printing privilege to be purchased based on auto purchasing without the purchase request by the user; and
      switch, based on the addition type information as obtained, a control mode between a first mode in which the first guaranteed print amount is added to the allowed print amount and a second mode in which the second guaranteed print amount is added to the allowed print amount.

2. The printing device according to claim 1,
   wherein the controller is further configured to disable the manual operation on an operation unit in the second mode.

3. The printing device according to claim 2,
   wherein the controller is configured not to display a content necessary to execute the purchase request on a display in the second mode.

4. The printing device according to claim 2,
   wherein the controller is further configured to output a control signal disabling the manual operation for the purchase request through the operation unit in the second mode.

5. The printing device according to claim 1,
   wherein the controller is further configured to output a control signal to display a content on a display based on the first mode or the second mode.

6. The printing device according to claim 5,
   wherein the controller is configured to output a control signal to display, on a display, that the control mode is the second mode in the second mode.

7. The printing device according to claim 5,
   wherein the controller is further configured to perform first determining whether or not the allowed print amount is less than or equal to a first threshold,
   wherein, when the allowed print amount is determined to be less than or equal to the first threshold in the first determining, the controller is configured to:
      in the second mode, output a control signal to display a wait-requesting message requesting to wait until completion of the auto purchasing on the display; and
      in the first mode, output a control signal to display a purchase-requesting message requesting to perform purchasing by the manual purchasing on the display.

8. The printing device according to claim 7,
   wherein, when the allowed print amount is determined to be less than or equal to the first threshold in the first determining, the controller is further configured to perform, in the first mode, outputting a control signal to display a message requesting switching to the second mode on the display.

9. The printing device according to claim 5,
   wherein the controller is further configured to perform second determining whether or not the allowed print amount is less than or equal to a second threshold, and
   wherein, when the allowed print amount is determined to be less than or equal to the second threshold in the second determining, the controller is configured to:
      in the first mode, output a control signal to display a consideration-prompting message prompting purchasing by the manual operation on the display.

10. The printing device according to claim 5,
    wherein the controller is further configured to perform third determining whether the printing device is online with respect to an information management device managing the printing privilege, and
    wherein, when the printing device is determined not to be online with respect to the information management device in the third determining, the controller is configured to:
       in the second mode, output a control signal to display a connection-requesting message requesting to communicably connect the printing device to the information management device on the display.

11. The printing device according to claim 5,
    wherein the controller is configured to:
       in the second mode, not output a control signal to display the allowed print amount on the display; and
       in the first mode, output the control signal to display the allowed print amount on the display.

12. The printing device according to claim 5,
    wherein the controller is configured to:
       in the second mode, output a control signal to display the allowed print amount on the display in a normally displaying manner, and
       in the first mode, output a control signal to display the allowed print amount on the display in a particular emphasized manner.

13. The printing device according to claim 5,
    wherein the controller is further configured to:
       in the second mode, output a control signal to display credit-related information related to a payment for the auto purchasing on the display.

14. A print amount management system, comprising:
    a terminal device;
    a printing device configured to print an image on a sheet; and
    a management device including:
       a communication interface through which the management device is communicable with the printing device and the terminal device; and a controller configured to manage the printing device,
wherein the print amount management system includes hardware configured to:
  obtain addition type information representing a first guaranteed print amount or a second guaranteed print amount, the first guaranteed print amount corresponding to a first printing privilege to be purchased based on a purchase request due to a manual operation by the user, the second guaranteed print amount corresponding to a second printing privilege to be purchased based on an auto purchasing without the purchase request by the user; and
  switch, based on the addition type information as obtained, a control mode between a first mode in which the first guaranteed print amount is added to an allowed print amount of the printing device and a second mode in which the second guaranteed print amount is added to the allowed print amount.

* * * * *